United States Patent
Hamada et al.

(12)

(10) Patent No.: US 6,177,181 B1
(45) Date of Patent: Jan. 23, 2001

(54) POROUS FILMS, PROCESS FOR PRODUCING THE SAME, AND LAMINATE FILMS AND RECORDING SHEETS MADE WITH THE USE OF THE POROUS FILMS

(75) Inventors: Toyozo Hamada; Shuji Nakatsuka, both of Himeji; Kiyoharu Mizumoto, Aioi, all of (JP)

(73) Assignee: Daicel Chemical Industries, Ltd., Osaka (JP)

( * ) Notice: Under 35 U.S.C. 154(b), the term of this patent shall be extended for 0 days.

(21) Appl. No.: 09/117,275

(22) PCT Filed: Dec. 8, 1997

(86) PCT No.: PCT/JP97/04488

§ 371 Date: Jul. 23, 1998

§ 102(e) Date: Jul. 23, 1998

(87) PCT Pub. No.: WO98/25997

PCT Pub. Date: Jun. 18, 1998

(30) Foreign Application Priority Data

Dec. 10, 1996 (JP) .................................................. 8-330000
Dec. 24, 1996 (JP) .................................................. 8-343563
Jun. 30, 1997 (JP) .................................................. 9-174315

(51) Int. Cl.[7] ...................................................... B32B 3/26
(52) U.S. Cl. ...................... 428/304.4; 428/426; 428/438; 428/461; 428/500; 428/535; 428/537.7; 526/238.21; 526/286; 526/328; 526/341
(58) Field of Search ............................... 428/304.4, 426, 428/438, 461, 500, 535, 537.7; 526/238.21, 286, 328, 341

(56) References Cited

FOREIGN PATENT DOCUMENTS

| | | |
|---|---|---|
| 37-16365 | 10/1962 | (JP) . |
| 48-19216 | 6/1973 | (JP) . |
| 58-166325 | 10/1983 | (JP) . |
| 60-141733 | 7/1985 | (JP) . |
| 61-86251 | 5/1986 | (JP) . |
| 62-264986 | * 11/1987 | (JP) . |
| 64-48026 | 2/1989 | (JP) . |
| 2-61669 | 5/1990 | (JP) . |
| 3-96332 | 4/1991 | (JP) . |
| 3-145005 | 6/1991 | (JP) . |
| 3-159791 | 7/1991 | (JP) . |
| 3-246095 | 11/1991 | (JP) . |
| 4-263982 | 9/1992 | (JP) . |
| 8-160652 | * 6/1996 | (JP) . |

* cited by examiner

*Primary Examiner*—Helen L. Pezzuto
(74) *Attorney, Agent, or Firm*—Birch, Stewart, Kolasch & Birch LLP (57) ABSTRACT

Porous membranes having a micro phase separation structure and showing a light transmittance at the wavelength of 400 nm of not less than 30% are obtained by the dry phase conversion method comprising drying a coating layer of a dope containing a polymer, a good solvent for the polymer and a poor solvent for the polymer which solvent has a higher boiling point than the good solvent. The polymer includes cellulose derivatives, vinyl-series polymers such as acrylonitrile-series polymers and (meth)acrylic acid ester-series polymers, polysulfone-series polymers, and the like. The porous polymer membranes have a porosity of 10 to 60%, a mean pore size of about 0.002 to 0.35 μm and a maximum pore size of not greater than 0.4 μm. These porous membranes shows not only excellent transparency but also high productivity.

21 Claims, 3 Drawing Sheets

POROUS FILMS, PROCESS FOR PRODUCING THE SAME, AND LAMINATE FILMS AND RECORDING SHEETS MADE WITH THE USE OF THE POROUS FILMS

This application is the national phase under 35 U.S.C. §371 of prior PCT International Application No. PCT/JP97/04488 which has an International filing date of Dec. 8, 1997 which designated the United States of America, the entire contents of which are hereby incorporated by reference.

TECHNICAL FIELD

The present invention relates to a porous membrane made of a polymer and excellent in transparency, a laminate film having the porous membrane and a process for producing the porous membrane.

BACKGROUND TECHNOLOGY

Since the creation of unsymmetric cellulose acetate membranes in 1960, there have been rapid developments in the field of porous polymer membranes and the fields of their application have been widening almost unlimitedly, for example in water purification to obtain ultrapure water, drinking water and industrial water, treatment of industrial waste water and municipal sewage, separation and purification of substances in various steps in chemical, pharmaceutical and food industries, and use in medical areas, typically in blood dialysis using artificial kidneys. Such porous polymer membranes mostly have a nonsymmetric structure composed of a skin layer (dense layer) and a support layer (porous layer) and are generally opaque. As regards the use of porous polymer membranes in areas where transparency is required, Japanese Patent Application Laid-open No. 48026/1989 (JP-A-64-48026), for instance, proposes liquid crystal panels comprising a transparent porous film impregnated with liquid crystal molecules and sandwiched between two panels. This reference, however, gives no mention of the material of the transparent porous film.

In Japanese Patent Application Laid-open No. 159791/1991 (JP-A-3-159791), there is proposed a thermal transfer recording sheet in which a transparent porous resin layer is used. While this reference mentions an ethylene-vinyl chloride copolymer as the resin for forming the porous resin layer, it has no mention of the process for forming the porous resin layer.

In Japanese Patent Application Laid-open No. 96332/1991 (JP-A-3-96332), there is proposed a superficially porous film which is a laminate film having a porous surface layer with the peak pore size in the pore size distribution curve being 0.06 to 2.0 µm and with less than five undulations per 4 µm which are higher than 0.2 µm, and having a haze of not more than 10%. The porous layer of this film is formed by applying a coating composition comprising a water-dispersible polymer and colloidal silica, followed by drying. Therefore, its water resistance is low, and the transparency is also low due to the difference in refractive index between the water-dispersible polymer and colloidal silica.

In Japanese Patent Application Laid-open No. 145005/1991 (JP-A-3-145005), a thin electrolyte membrane is proposed which comprises a porous solid polymer membrane having independent through holes with a mean diameter of 0.01 to 0.7 µm, with the holes being filled with an ionic conductor material. This porous solid polymer membrane is produced by irradiating a thin polymer membrane with charged particles and etching the tracks of the charged particles with an alkali to form pores. The porous membrane obtained by this method is semitransparent. For rendering it transparent, it is necessary to fill the pores with a liquid having a refractive index approximately equal to that of the membrane material.

In Japanese Patent Application Laid-open No. 263982/1992 (JP-A-4-263982), a recording sheet is proposed which comprises a substrate provided with a porous layer of cellulose acetate and a colorant-carrying layer consisting of pseudoboehmite as the top layer. The porous layer is formed by dissolving cellulose acetate in a solvent such as acetone, adding magnesium perchlorate or the like in a suitable amount and applying the resulting coating composition, followed by drying. The transparency of the film is reduced by precipitation of magnesium perchlorate or the like upon evaporation of the solvent.

In Japanese Patent Application Laid-open No. 86251/1986 (JP-A-61-86251), a recording sheet is disclosed which is a laminate comprising a substrate film layer, a liquid-absorbing layer formed on at least one side of the substrate film layer, and a porous, thin plastic membrane layer (a polyethylene or polypropylene film with a large number of pores having a diameter of 0.01 to 0.1 µm formed therein) bonded to the liquid-absorbing layer by means of a hot press. However, no description is given of the method of preparing the porous, thin membrane layer.

On the other hand, the following methods, among others, are known for the production of porous polymer membranes: (1) the phase separation method which comprises subjecting a polymer to micro phase separation using a good solvent and a poor solvent; (2) the foaming method which comprises forming a polymer to form pores; (3) the stretching method which comprises stretching a polymer film; (4) the irradiation method which comprises exposing a polymer film to radiation to form a hole; (5) the extraction method which comprises preparing a film from a polymer or inorganic salt soluble in a solvent and a polymer insoluble in the solvent and removing the soluble component by extraction with the solvent to cause hole formation; and (6) the sintering method which comprises partially fusing polymer particles or partially binding polymer particles using a binder and utilizing the resulting voids or gaps among the particles as pores.

Among the above methods, the phase separation method is the commonest. Thus, for example, Japanese Patent Application Laid-open No. 246095/1991 (JP-A-3-246095) discloses a technique for forming a porous plastic surface layer by applying a plastic solution to a transparent plastic film substrate, followed by wet coagulation. According to this reference, a solution of a saturated copolyester resin in dimethylformamide is applied to a substrate and coagulated in water and the coated substrate is further immersed in a hot water and dried, whereby a white, devitrified, porous plastic surface layer is formed.

However, the phase separation method generally gives nonsymmetric membranes comprising a dense surface layer and a porous underlying layer(void layer). The void layer has a large pore size, opacifying the porous membranes. If transparent membranes are formed, they will be nonporous membranes unusable in the fields where pores are useful. It is thus difficult to obtain membranes or films having a porous structure while retaining high transparency.

Accordingly, it is an object of the present invention to provide highly transparent porous membranes and a process for producing the same.

Another object of the invention is to provide porous membranes high in transparency and ink absorption and excellent in water resistance, and a process for producing the same.

A further object of the invention is to provide a process for producing highly transparent porous membranes with high productivity.

DISCLOSURE OF THE INVENTION

To accomplish the above objects, the present inventors made intensive investigations paying particular attention to the dry phase conversion method which is outstanding, among the methods of producing porous polymer membranes, in effectiveness in mass production and, as a result, found that when a specific combination of solvents is employed, porous polymer membranes with remarkable transparency can be obtained. This finding has now led to completion of the present invention.

Thus, the porous membrane of the present invention comprises a polymer and shows a light transmittance of not less than 30% at the wavelength of 400 nm. This porous membrane usually has a micro phase separation structure. In the porous membrane, the mean size of pores may be 0.002 to 0.35 μm, the maximum pore size may be about 0.4 μm, and the porosity may be about 10 to 60%. The polymer includes various polymers, for example cellulose derivatives (e.g. cellulose esters such as cellulose acetate with a degree of acetylation of 42 to 62% and a viscosity average polymerization degree of 50 to 800), vinyl-series polymers ((meth)acrylonitrile-series polymers, (meth)acrylic polymers, etc.), polysulfone-series polymers and so on. The porous membrane of the present invention also includes a porous membrane (A) comprising a polymer and having (B1) a porosity of 10 to 60% or (B2) pores having a mean pore size of 0.002 to 0.35 μm, with the maximum pore size being not more than 0.4 μm, and (C) showing a light transmittance of not less than 30% at the wavelength of 400 nm.

The laminate film of the present invention includes (1) a laminate film comprising a substrate and a porous layer formed on at least one side of the substrate, in which the porous layer comprises a polymer and shows a light transmittance of at least 30% at the wavelength of 400 nm, and (2) a laminate film comprising a porous layer interposed or sandwiched between substrates, in which the porous layer comprises a polymer and shows a light transmittance of not less than 30% at the wavelength of 400 nm.

The porous membrane mentioned above can be produced by drying a coating film of a dope comprising a polymer, a good solvent for the polymer and a poor solvent for the polymer which has a higher boiling point than the good solvent.

The term "membrane" as used herein means a two-dimensional structure such as a thin membrane, a film, a sheet or the like.

BEST MODE FOR CARRYING OUT THE INVENTION

[Polymer]

The porous membrane of the invention comprises a polymer and generally has a micro phase separation structure. This micro phase separation structure is formed by coagulation of a gel phase resulting from phase separation upon a change in composition of a flow-cast polymer solution. The configuration of the pores formed among particles are generally indefinite or amorphous, irregular, and non-circular or non-spherical.

Usable as the polymer mentioned above are various thermoplastic polymers and thermosetting polymers. Thermoplastic polymers are generally used. Examples of the polymer are as follows:

Cellulose Derivatives

Cellulose esters, for example organic acid esters such as cellulose acetate, cellulose propionate, cellulose butyrate, cellulose acetate propionate, cellulose acetate butyrate and cellulose acetate phthalate; inorganic acid esters such as cellulose nitrate, cellulose sulfate and cellulose phosphate; mixed acid esters such as cellulose nitrate acetate, etc.

Cellulose ethers, for example methylcellulose, ethylcellulose, isopropylcellulose, butylcellulose, benzylcellulose, hydroxyethylcellulose, hydroxypropylcellulose, carboxymethylcellulose, carboxyethylcellulose, cyanoethylcellulose, etc.

Vinyl-series Polymers

Olefinic polymers, for example olefin homo- or copolymers (polyethylene, polypropylene, poly-1-butene, polyisobutene, polybutadiene, polyisoprene, polyallene, ethylyene-propylene copolymer, etc.), copolymers of an olefin and a monomer copolymerizable therewith (ethylene-vinyl acetate copolymer, ethylene-(meth)acrylic acid copolymer, ethylene-(meth)acrylic acid ester copolymers, modified polyolefins, etc.)

Halogen-containing vinyl polymers, for example homo- or copolymers of halogen-containing vinyl monomers (polyvinyl chloride, polyvinylidene chloride, polyvinyl bromide, polyvinyl fluoride, polyvinylidene fluoride, etc.), copolymers of a halogen-containing vinyl monomer and a copolymerizable monomer (vinyl chloride-vinyl acetate copolymers, vinylidene chloride-vinyl acetate copolymer, vinylidene chloride-(meth)acrylamide copolymer, vinylidene chloride-(meth)acrylic acid copolymer, vinylidene chloride-(meth)acrylic acid ester copolymers, etc.)

Vinyl ester-series polymers or derivatives thereof, for example polyvinyl acetate, polyvinyl alcohol, ethylene-vinyl alcohol copolymer, polyvinyl acetal-series polymers (polyvinyl formal, polyvinyl acetal, polyvinyl butyral, etc.)

Styrenic polymers, for example homo- or copolymers of aromatic vinyl monomers (styrenic monomers) (polystyrene, poly(α-methylstyrene), poly(4-chlorostyrene), etc.), copolymers of an aromatic vinyl monomer and a copolymerizable monomer (styrene-$C_{1-10}$ alkyl (meth) acrylate copolymers, styrene-maleic anhydride copolymer, styrene-maleimide copolymer, etc.)

Allyl alcohol-series polymers, for example, allyl alcohol-$C_{1-6}$ alkyl vinyl ether copolymers (allyl alcohol-methyl vinyl ether copolymer, etc.)

Polyvinyl ketones, for example polyvinyl methyl ketone, polyvinyl methyl isobutyl ketone, polymethyl isopropenyl ketone, etc.

Polyalkyl vinyl ethers, for example polymethyl vinyl ether, methyl vinyl ether-maleic anhydride copolymer, etc.

(Meth)acrylic polymers, for example homo- or copolymers of (meth)acrylic monomers [(meth)acrylonitrile, a (meth)acrylate monomer, etc.], copolymers of a (meth) acrylic monomer and a copolymerizable monomer [a vinyl-series monomer such as a vinyl ester-series monomer, a heterocyclic vinyl-series monomer, an aromatic vinyl monomer, or a polymerizable unsaturated dicarboxylic acid or a derivative thereof]

Polysulfone-series Polymers

Polysulfones, polyethersulfones, etc.

Polyoxide-series Polymers

Polyoxymethylene, polyoxymethylene copolymers (polyacetal resins), polyoxyethylene, polyoxypropylene, polyoxyethylene-polyoxypropylene copolymer, etc.

Polyamide and Polyimide-series Polymers

Polyamides (nylon 6, nylon 66, nylon 11, nylon 12, nylon 6/11, nylon 6/12, etc.), polyesteramides, polyimides, polyamideimides, etc.

Polyester-series Polymers (Saturated Polyesters, etc.)

Poly($C_{2-6}$ alkylene terephthalates)(polyethylene terephthalate, polybutylene terephthalate, etc.), poly($C_{2-6}$ alkylene naphthalates) (polyethylene naphthalate, etc.), copolyesters (polyalkylene terephthalate-series or polyalkylene naphthalate-series copolyesters obtainable by at least partial replacement of the diol component and the terephthalic acid component with a different diol component or dicarboxylic component including diol components such as ethylene glycol, propylene glycol, butanediol, hexanediol, polyoxy($C_{2-4}$-alkylene glycol and cyclohexanedimethanol, aromatic dicarboxylic acids such as phthalic acid and isophthalic acid or acid anhydrides thereof, $C_{6-12}$ aliphatic dicarboxylic acids such as adipic acid, etc.)

Polycarbonates

Aromatic polycarbonates (bisphenol A-based polycarbonates, etc.)

Other Polymers

Thermoplastic urethane-series polymers (polyurethanes in which a polyester diol or polyether diol, for instance, is used as the diol component, etc.), polyether ether ketones, polyetheresters, polyphenylene ether, polyphenylene sulfide, polyethylenimine, etc.

These polymers may be used either alone or in combination as a mixture of two or more of them.

At least one polymer selected from the group consisting of cellulose derivatives, vinyl-series polymers and polysulfone-series polymers is included among preferred polymers.

Preferred cellulose derivatives include cellulose esters, for example organic acid esters of cellulose (e.g. esters with an organic acid containing about 2 to 4 carbon atoms), in particular cellulose acetates (cellulose diacetate, cellulose triacetate, etc.).

The viscosity average degree of polymerization of the cellulose derivatives (cellulose esters, etc.) is, for example, about 50 to 800, preferably about 75 to 500, more preferably about 100 to 250 (especially 100 to 200). A cellulose acetate having a viscosity average degree of polymerization of about 100 to 190 may also be used effectively.

The viscosity average degree of polymerization of a cellulose ester, such as cellulose acetate, can be determined by the intrinsic viscosity method of Uda et al. (Kazuo Uda and Hideo Saito: Journal of the Society of Fiber Science and Technology, Japan, vol. 18, No. 1, pp. 105–120, 1962). Thus, an accurately weighed amount of the cellulose ester is dissolved in a mixed solvent composed of methylene chloride and methanol (9/1 by weight) to prepare a solution having a specified concentration c (2.00 g/L). This solution is poured into an Ostwald viscometer and the time t (in seconds) required for the solution to pass through the space between the marked lines of the viscometer at 25° C. is measured. Separately, the time $t_0$ (in seconds) required for the passage of the above mixed solvent alone is measured in the same manner. The viscosity average degree of polymerization is calculated as follows:

$$\eta_{rel} = t/t_0$$

$$[\eta] = (\ln \eta_{rel})/c$$

$$DP = [\eta]/(6 \times 10^{-4})$$

where t is the time (in seconds) for the passage of the solution, $t_0$ is the time (in seconds) for the passage of the solvent, c is the cellulose ester concentration of the solution (g/L), $\eta_{rel}$ is the relative viscosity, $[\eta]$ is the intrinsic viscosity, and DP is the average degree of polymerization.

The mean degree of substitution of the cellulose derivative can be selected within the range of about 1 to 3. For example, a preferred cellulose acetate has a mean degree of acetylation of about 42 to 62% (e.g 43% to 60%), preferably about 42 to 57%. When the degree of substitution (degree of acetylation) is too low, the solubility in solvents is low. When the viscosity average degree of polymerization is too low, the pore size of the porous membrane becomes small or the membrane tends to become nonporous, whereas when it is too high, the pore size becomes large and the porous membrane tends to become opaque.

Among the vinyl-series polymers, (meth)acrylonitrile-series polymers and (meth)acrylic acid ester-series polymers are preferred. In other words, homo- or copolymers of at least one (meth)acrylic monomer selected from (meth)acrylonitrile and (meth)acrylic acid ester-series monomers, and copolymers of such a (meth)acrylic monomer and a different copolymerizable monomer [at least one monomer selected from the group consisting of vinyl ester-series monomers, heterocyclic vinyl-series monomers, aromatic vinyl monomers, and polymerizable unsaturated dicarboxylic acids or derivatives thereof] are preferred.

The (meth)acrylontirile-series polymers include polyacrylonitrile, polymethacrylonitrile, copolymers of (meth)acrylonitrile and a copolymerizable monomer or monomers. Examples of the copolymerizable monomers are vinyl ester- series monomers (vinyl formate, vinyl acetate, vinyl propionate, etc.), (meth)acrylic monomers [(meth) acrylic acid, $C_{1-10}$ alkyl (meth)acrylates such as methyl (meth)acrylate, ethyl (meth)acrylate, butyl (meth)acrylate, hexyl (meth)acrylate, 2-ethylhexyl (meth)acrylate, etc., hydroxyalkyl (meth)acrylates such as 2-hydroxyethyl (meth)acrylate, 2-hydroxypropyl (meth)acrylate, 4-hydroxybutyl (meth)acrylate, etc., glycidyl (meth) acrylate, alkylamino-alkyl (meth)acrylates such as dimethylaminoethyl (meth)acrylate, diethylaminoethyl (meth) acrylate, diethylaminopropyl (meth)acrylate, etc., (meth) acrylamide, N-methyl(meth)acrylamide, methylol(meth) acrylamide, alkoxymethyl(meth)acrylamides, etc.], heterocyclic vinyl-series monomers (5- or 6-membered heterocyclic vinyl-series monomers containing at least one hetero atom selected from nitrogen, oxygen and sulfur atoms, such as vinylpyrrolidone, vinylpyridine, vinylpiperidine, vinylimidazole, vinylcarbazole, etc.), aromatic vinyl monomers (styrene, vinyltoluene, α-methylstyrene, etc.), polymerizable unsaturated dicarboxylic acids or derivatives thereof (itaconic acid, maleic acid, maleic anhydride, fumaric acid, lower alkyl esters or acid anhydrides of these, maleimide, N-alkylmaleimides, N-phenylmaleimide, etc.) and the like. These copolymerizable monomers may be used either singly or in combination.

Preferred as copolymerizable monomers are vinyl ester-series monomers (vinyl acetate, etc.), (meth)acrylic monomers [(meth)acrylic acid, $C_{1-8}$ alkyl (meth)acrylates, $C_{1-4}$ alkylamino-$C_{2-4}$ alkyl (meth)acrylates, etc.], nitrogen-containing heterocyclic vinyl-series monomers (vinylpyrrolidone, etc.), and combinations of these.

As examples of the (meth)acrylonitrile-series copolymers, there may be mentioned acrylonitrile-vinylpyrrolidone copolymer, acrylonitrile-vinyl acetate copolymer, acrylonitrile-$C_{1-8}$ alkyl (meth)acrylate copolymers (acrylontirile-methyl acrylate copolymer, etc.), acrylonitrile-vinylpyrrolidone-$C_{1-8}$ alkyl (meth)acrylate copolymers, acrylonitrile-vinyl acetate-$C_{1-8}$ alkyl (meth)acrylate copolymers, acrylonitrile-(meth)acrylic acid copolymer, acrylonitrile -vinyl acetate-(meth)acrylic acid copolymer, and acrylonitrile-$C_{1-8}$ alkyl (meth)acrylate-(meth)acrylic acid copolymers, among others.

As examples of the (meth)acrylic acid ester-series polymers, there may be mentioned the above-mentioned homo- or copolymers of (meth)acrylic acid esters [e.g. poly(meth)acrylic acid, homo- or copolymers of $C_{1-8}$ alkyl (meth)acrylate (polymethyl (meth)acrylate, polyethyl (meth)acrylate, polybutyl (meth)acrylate, $C_{1-10}$ alkyl (meth)acrylate-(meth)acrylic acid copolymers such as methyl methacrylate-(meth)acrylic acid copolymer, $C_{1-10}$ alkyl methacrylate-$C_{1-10}$ alkyl acrylate copolymers such as methyl methacrylate-$C_{1-10}$ alkyl acrylate copolymers, etc.)], copolymers of a (meth)acrylic monomer and a copolymerizable monomer (a vinyl ester-series monomer, an aromatic vinyl monomer, a polymerizable unsaturated dicarboxylic acid or a derivative thereof, etc.) [e.g. $C_{1-10}$ alkyl (meth)acrylate-styrene copolymers such as methyl methacrylate-styrene copolymer, $C_{1-10}$ alkyl (meth)acrylate-(meth)acrylic acid-styrene copolymers such as methyl methacrylate-(meth)acrylic acid-styrene copolymer, etc.] and the like.

An outstanding feature of the present invention is in that a membrane is highly transparent in spite that it is a porous membrane (in particular a porous membrane having a micro phase separation structure). Thus, the light transmittance of the porous membrane at the wavelength of 400 nm is not less than 30% (i.e. 30 to 100%), preferably about 35 to 100%, more preferably about 50 to 100% (e.g. 55 to 100%), especially about 60 to 100%, and more especially about 70 to 100%. Even porous membranes having a light transmittance of as high as about 80 to 100%, thus being highly transparent, can be obtained.

The porous membrane has a maximum pore size of not larger than 0.5 μm (in particular not larger than 0.4 μm). The mean pore size is 0.002 to 0.35 μm (e.g. 0.004 to 0.3 μm), preferably about 0.005 to 0.3 μm (e.g. 0.007 to 0.2 μm), and more preferably about 0.01 to 0.2 μm (e.g. 0.05 to 0.2 μm).

Further, the porous membrane has a porosity of, for example, about 10 to 60% (e.g. 15 to 50%), preferably about 15 to 55%, and more preferably about 20 to 50%.

The thickness of the porous membrane is not critical but can be selected according to the intended use thereof. For example, it is about 1 to 100 μm, preferably about 2 to 70 μm, more preferably about 3 to 50 μm. When the thickness is too small, the strength and water resistance will be insufficient. When it is too thick, the transparency may possibly be reduced in an application.

[Process for Producing the Porous Membrane]

The porous membrane of the present invention can be produced by the dry phase conversion method, namely by casting or applying a homogeneous dope containing a polymer, a good solvent for the polymer and a poor solvent for the polymer onto a substrate or support, and causing the solvents to evaporate to induce micro phase separation, although it can also be produced by another micro phase separation method, for example by the wet phase separation method comprising casting or applying a solution of a polymer in a good solvent onto a substrate, followed by immersion in a poor solvent for the polymer. In the dry phase conversion method, it is particularly important that, as the poor solvent, a solvent having a higher boiling point (high-boiling solvent) than the good solvent is used.

In the above dry phase separation process, the good and poor solvents should be selected with consideration for controlling the pore size of the porous membrane and attaining high transparency.

The good solvent can be selected according to the polymer species, for example from ketones ($C_{3-5}$ dialkyl ketones such as acetone, methyl ethyl ketone and methyl propyl ketone, cyclohexanone, etc.), esters ($C_{1-4}$ alkyl formates such as ethyl formate, $C_{1-4}$ alkyl acetates such as methyl acetate, ethyl acetate and butyl acetate, ethyl propionate, ethyl lactate, etc.), ethers (cyclic or linear $C_{4-6}$ ethers such as 1,4-dioxane, tetrahydrofuran, tetrahydropyran, diethyl ether, diisopropyl ether, dimethoxyethane, etc.), cellosolves ($C_{1-4}$ alkyl-cellosolves such as methylcellosolve, ethylcellosolve, butylcellosolve, etc.), cellosolve acetates ($C_{1-4}$ alkyl-cellosolve acetates such as methylcellosolve acetate, ethyl-cellosolve acetate, etc.), aromatic hydrocarbons (benzene, toluene, xylene, etc.), halogenated hydrocarbons (methylene chloride, ethylene chloride, etc.), amides (acylamides such as formamide and acetamide, mono- or di-$C_{1-4}$ alkyl acylamides such as N-methylformamide, N-methylacetamide, N,N-dimethylformamide, N,N-dimethylacetamide, etc.), sulfoxides (di-$C_{1-3}$ alkyl sulfoxides such as dimethyl sulfoxide), nitriles ($C_{1-6}$ alkylnitriles such as acetonitrile, chloroacetonitrile, propionitrile and butyronitrile, benzonitrile, etc.), organic acids (formic acid, acetic acid, propionic acid, etc.), organic acid anhydrides (maleic anhydride, acetic anhydride, etc.), and mixed solvents of these. The good solvent may contain a nitro compound (e.g. nitromethane, nitroethane, nitropropane) or a lower alcohol (e.g. $C_{1-4}$ alcohol such as methanol and ethanol, diacetone alcohol).

The good solvent can be selected according to the polymer species. More specifically, good solvents preferred for cellulose derivatives include $C_{3-5}$ dialkyl ketones such as methyl ethyl ketone (in particular acetone, methyl ethyl ketone), $C_{1-4}$ alkyl acetates such as ethyl acetate (in particular methyl acetate, ethyl acetate), cyclic or linear $C_{4-6}$ ethers such as dioxane and dimethoxyethane, $C_{1-4}$ alkyl-cellosolves such as methylcellosolve (in particular methylcellosolve, ethylcellosolve), $C_{1-4}$ alkyl-cellosolve acetates such as methylcellosolove acetate (in particular methylcellosolve acetate, ethylcellosolve acetate) and mixed solvents composed of these. Where the cellulose derivative is cellulose acetate, particularly preferred good solvents include solvents comprising at least one $C_{1-2}$ alkyl-cellosolve (especially methylcellosolve).

Good solvents for acrylonitrile-series polymers, among the vinyl-series polymers, include amides (formamide, N,N-dimethylformamide, acetamide, N,N-dimethylacetamide, etc.), sulfoxides (dimethyl sulfoxide, etc.), ethers (cyclic ethers such as tetrahydrofuran, tetrahydropyran, 1,4-dioxane, etc.), nitrites (acetonitrile, chloroacetonitrile, propionitrile, butyronitrile, malononitrile, fumaronitrile, etc.), organic acid anhydrides (maleic anhydride, acetic anhydride, etc.), and mixtures of these solvents. Preferred good solvents comprise at least amides (in particular N,N-dimethylformamide or the like).

Good solvents for (meth)acrylic polymers, among the vinyl polymers, include ketones ($C_{3-5}$ dialkyl ketones such as acetone, methyl ethyl ketone and methyl propyl ketone, cyclohexanone, etc.), esters ($C_{1-4}$ alkyl formates such as ethyl formate, $C_{1-4}$ alkyl acetates such as methyl acetate, ethyl acetate and butyl acetate, ethyl propionate, ethyl lactate, etc.), aromatic hydrocarbons (benzene, toluene, xylene, etc.), halogenated hydrocarbons (methylene chloride, ethylene chloride, etc.), amides (N,N-dimethylformamide, N,N-dimethylacetamide, etc.), sulfoxides (dimethyl sulfoxide, etc.), ethers (cyclic ethers such as tetrahydrofuran and 1,4-dioxane, etc.), and mixed solvents composed of these.

Good solvents for polysulfone-series polymers include amides (N,N-dimethylformamide, N,N-dimethylacetamide, etc.), sulfoxides (dimethyl sulfoxide, etc.), and mixed solvents composed of these.

The boiling point of the good solvent is selected from a range of about 35 to 200° C. (e.g. 35 to 180° C.), preferably about 35 to 170° C. (e.g. 30 to 160° C.), and more preferably about 40 to 160° C. (e.g. 40 to 125° C.). The boiling point is generally about 35 to 150° C. (e.g. 35 to 130° C.).

The term "poor solvent" means a solvent lacking or low in solubility for the polymer. Every solvent having a higher boiling point than the above-mentioned good solvent may be used as such. The poor solvent is thus not limited to any particular species. As examples of the poor solvent, there may be mentioned, among others, esters ($C_{5-8}$ alkyl formates such as amyl formate and isoamyl formate, $C_{3-10}$ alkyl $C_{2-4}$ aliphatic carboxylates which may have a $C_{1-4}$ alkoxy group (e.g. $C_{4-10}$ alkyl acetates which may have a $C_{1-4}$ alkoxy group), such as butyl acetate, amyl acetate, hexyl acetate, octyl acetate, 3-methoxybutyl acetate, 3-ethoxybutyl acetate, butyl propionate, 3-methoxybutyl propionate, etc., $C_{1-4}$ alkyl benzoates such as methyl benzoate, ethyl benzoate and propyl benzoate), alcohols ($C_{4-8}$ cycloalkanols which may be substituted with one or more $C_{1-4}$ alkyl groups, such as cyclopentanol, cyclohexanol, methylcyclohexanol, dimethylcyclohexanol and cyclooctanol, $C_{5-8}$ alcohols such as amyl alcohol, isoamyl alcohol and hexyl alcohol, $C_{2-6}$ alkoxy-$C_{1-4}$ alcohols such as 2-butoxyethanol and 3-butoxypropanol, heterocyclic alcohols such as furfuryl alcohol, etc.), ketones ($C_{3-10}$ dialkyl ketones (in particular $C_{6-10}$ dialkyl ketones) such as methyl butyl ketone, methyl isobutyl ketone, methyl pentyl ketone, methyl isopentyl ketone and 2,6-dimethyl-4-heptanone, acetonylacetone, acetophenone, etc.), ethers ($C_{7-10}$ ethers such as methyl phenyl ether, methoxytoluene, dibutyl ether and benzyl ethyl ether), aliphatic hydrocarbons ($C_{5-20}$ aliphatic hydrocarbons such as hexane, octane, nonane and decane), and mixtures of these.

Poor solvents preferred for cellulose derivatives include solvents comprising at least one solvent selected from the group consisting of esters ($C_{5-8}$ alkyl formates, $C_{1-4}$ alkyl benzoates, etc.), $C_{4-8}$ cycloalkanols, $C_{6-10}$ dialkyl ketones and $C_{7-10}$ ethers, in particular a solvent comprising at least $C_{5-7}$ cycloalkanols (especially cyclohexanols). The cyclohexanols include cyclohexanol, and mono- or di-$C_{1-2}$ alkyl-substituted cyclohexanols such as methylcyclohexanol and dimethylcyclohexanol.

Poor solvents preferred for acrylonitrile-series polymers, (meth)acrylic acid ester-series polymers and polysulfone-series polymers include alkyl acetates which may have a $C_{1-4}$ alkoxy group ($C_{1-4}$ alkoxy-$C_{3-7}$ alkyl acetates such as 3-methoxybutyl acetate and 3-methoxypentyl acetate, etc.), $C_{4-8}$ alkoxy-$C_{1-4}$ alkyl alcohols such as 2-butoxyethanol and 2-hexyloxyethanol, ketones ($C_{6-10}$ dialkyl ketones such as methyl butyl ketone, methyl isobutyl ketone, methyl pentyl ketone and methyl isopentyl ketone, acetonylacetone, acetophenone) and the like.

The poor solvent generally has a boiling point of about 100 to 230° C., preferably about 120 to 200° C. In general, the boiling point of the poor solvent is higher than that of the above-mentioned good solvent by about 20° C. or more (about 20 to 60° C.), and preferably by about 30 to 50° C.

The ratio between the good and poor solvents is not limited to any particular range provided that they can form a homogeneous solution for the polymer. Usually, the poor solvent is used in an amount of about 1 to 50 parts by weight (e.g. 3 to 50 parts by weight), preferably about 2 to 40 parts by weight (e.g. 5 to 40 parts by weight), more preferably about 3 to 35 parts by weight (e.g. 10 to 35 parts by weight), and generally about 3 to 30 parts by weight, relative to 100 parts by weight of the good solvent.

Further, the content of the polymer in the dope can be selected according to the degree of polymerization of the polymer and the like, and is, for example, about 5 to 30% by weight, preferably about 5 to 25% by weight, and in particular about 5 to 20% by weight (e.g. 5 to 15% by weight).

The dope contains the poor solvent in an amount of about 3 to 40 parts by weight per 100 parts by weight of a good solvent solution containing the polymer at a concentration of about 5 to 30% by weight. The dope can preferably be prepared by adding about 3 to 40 parts by weight (preferably 3 to 30 parts by weight) of the poor solvent to 100 parts by weight of the good solvent solution containing the polymer at a concentration of about 5 to 20% by weight (in particular 5 to 15% by weight) with inhibiting precipitation.

A conventional additive or additives may be added to the dope (coating composition) in an amount not to adversely affect the characteristics of the porous membrane, examples of the additive including antifoaming agents, coating performance improvers, thickeners, lubricants, stabilizers (antioxidant, ultraviolet absorber, heat stabilizer, etc.), antistatics, and antiblocking agents.

The dope may be cast onto or applied to at least one side of a substrate by the conventional casting or coating method, for example by the roll coater, air knife coater, blade coater, rod coater, bar coater, comma coater, gravure coater, silk screen coater method or the like.

As the substrate, there may be mentioned paper, coated paper, nonwoven fabric, plastic film, glass, ceramic, metal and so on. A preferred substrate is a release paper, a single-layer or composite film which at least comprises a plastic film.

Although the substrate may be opaque or semitransparent, the substrate is generally transparent for effective utilization of the transparency of the porous membrane.

The polymer constituting the plastic film includes, among others, cellulose derivatives such as cellulose acetate, polyolefins such as polyethylene and polypropylene, ethylene-vinyl acetate copolymer, polystyrene, polyvinyl chloride, poly(meth)acrylic acid esters, polyesters (polyalkylene terephthalates such as polyethylene terephthalate and polybutylene terephthalate, polyalkylene naphthalates such as polyethylene naphthalate and polybutylene naphthalate, etc.), polyamides (polyamide 6, polyamide 6/6, polyamide 6/10, polyamide 6/12, etc.), polyvinyl alcohol, ethylene-vinyl alcohol copolymer, polycarbonates, polyesteramides, polyethers, polyimides, polyamideimides, polyetheresters, and copolymers, blends and crosslinked products of these. Among these films, polyolefins (in particular polypropylene), polyesters (polyethylene terephthalate, etc.), polyamides and the like are used practically.

The plastic film may contain a conventional additive or additives, such as an antioxidant, ultraviolet absorber, heat stabilizer, lubricant, pigment, etc., when necessary. For improving the adhesiveness to the porous membrane, it may be subjected to corona discharge treatment or undercoat treatment, for instance.

In the process for producing the transparent porous polymer membrane according to the present invention, the first step is to coat the substrate with the dope which contains a polymer, a good solvent for the polymer and a poor solvent for the polymer having a higher boiling point than the good solvent.

In the drying step for drying the dope thus applied, the good solvent having a lower boiling point evaporates preferentially. With the progress of this good solvent evaporation, the solubility of the polymer in the dope decreases and the polymer forms micelles (gel phase), resulting in phase separation from the poor solvent phase. With the further progress of drying, micelles contact with one another to form a network structure. Upon completion of the poor solvent evaporation, a porous membrane or porous film is formed.

Therefore, the drying conditions are also important. Thus, in the step of drying of the dope applied, the drying may be carried out in one step but is preferably performed in two steps, first at a lower temperature to evaporate the low-boiling good solvent (for example, thus substantially completing the evaporation of the low-boiling good solvent) and then at a higher temperature to evaporate the remaining poor solvent. The two-step drying conditions can be selected depending on the species of the good solvent and the poor solvent. It is generally desirable that the first drying step be carried out at a temperature of about 10 to 100° C. (preferably 20 to 70° C., for example 20 to 60° C.) for about 30 seconds to 60 minutes (preferably 1 to 60 minutes), and the second drying step at a temperature higher than that in the first step, for example a temperature of about 50 to 150° C. (preferably 60 to 130° C.) for about 2 seconds to 30 minutes (e.g. 2 seconds to 10 minutes). Generally, the temperature in the second drying step can be selected within a temperature range higher by at least 20° C. (about 20 to 120° C., preferably about 50 to 110° C.) than the drying temperature in the first step. Preferably, the first drying step is carried out in a high humidity atmosphere at a relative humidity of 50 to 100% RH (preferably 70 to 100% RH).

After the drying step, the coating is peeled off from the substrate to give a highly transparent porous membrane or film. The porous membrane of the present invention is, in spite of being porous, highly transparent. The dry phase separation method contributes to the production of the highly transparent porous membrane at a high productivity.

[Laminate Film]

The laminate film of the present invention has a porous membrane formed on at least one side of the above-mentioned substrate. This laminate film can be produced without peeling off the porous membrane formed on the substrate by the above method.

Furthermore, the laminate film of the present invention includes a laminate film comprising a pair of substrates and a porous layer interposed or sandwiched therebetween. Such a laminate film can be obtained by forming the porous membrane on one of the substrates and laminating another substrate on the porous membrane, if necessary via an intermediate adhesive layer.

The porous layer of the laminate film may be supplemented with a functional material such as liquid crystal molecules, an ionic conductor or a dichromatic coloring matter by immersion or dispersion, so that the resulting laminate film can be utilized as a functional film (e.g. liquid crystal film, conductive film, polychromatic polarizing plate). When the above-mentioned transparent porous membrane is laminated on a metallic reflector, the resulting laminate film can be utilized as an optically interfering film, which gains color by interference of light.

Since the porous membrane of the present invention is excellent in transparency, it can be used in a variety of fields where transparency is required, for example as an element for crystal optics or optical elements, a recording sheet, a functional film material, a separation membrane, or an analytical element impregnated with an enzyme or the like. By way of example, when the porous membrane or film is applied as an ink image-accepting layer of a recording sheet for use in an ink jet recording system or the like, the absorption of ink can be improved.

[Recording Sheet]

Figure 1:
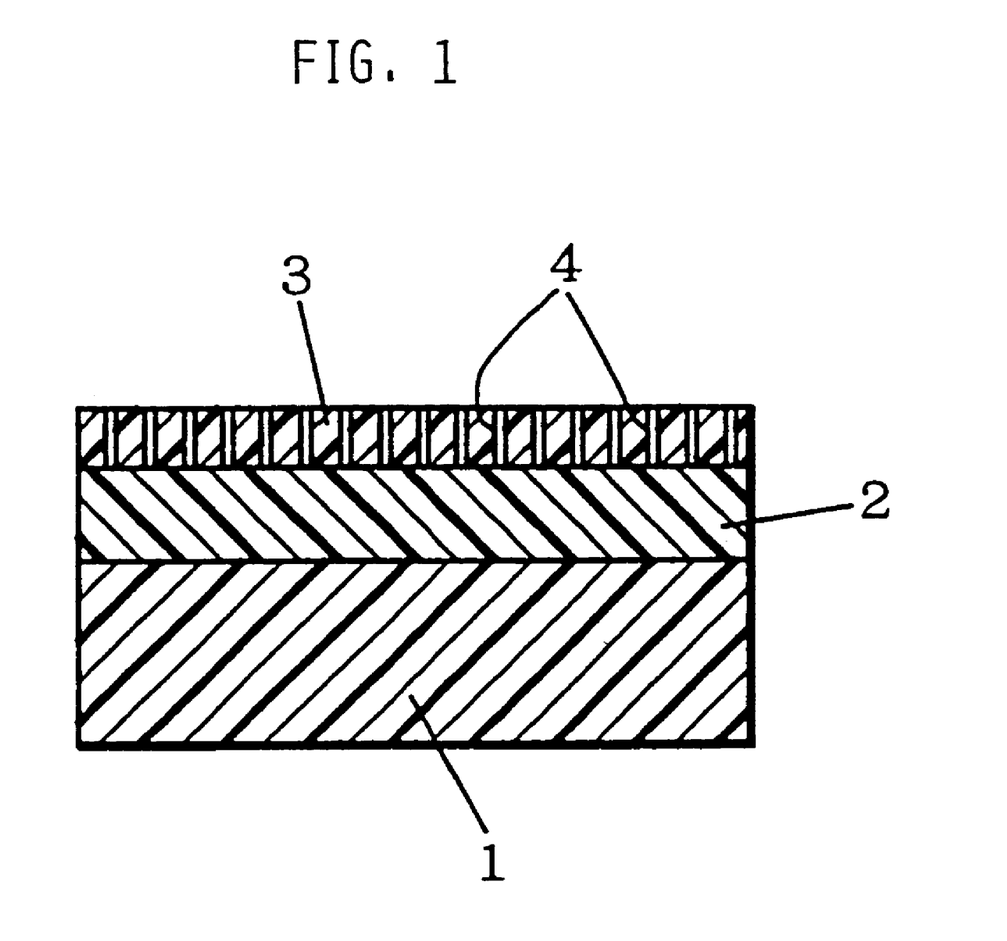
FIG. 1 is a schematic representation, in section, of an embodiment of the present invention.
Figure 2:
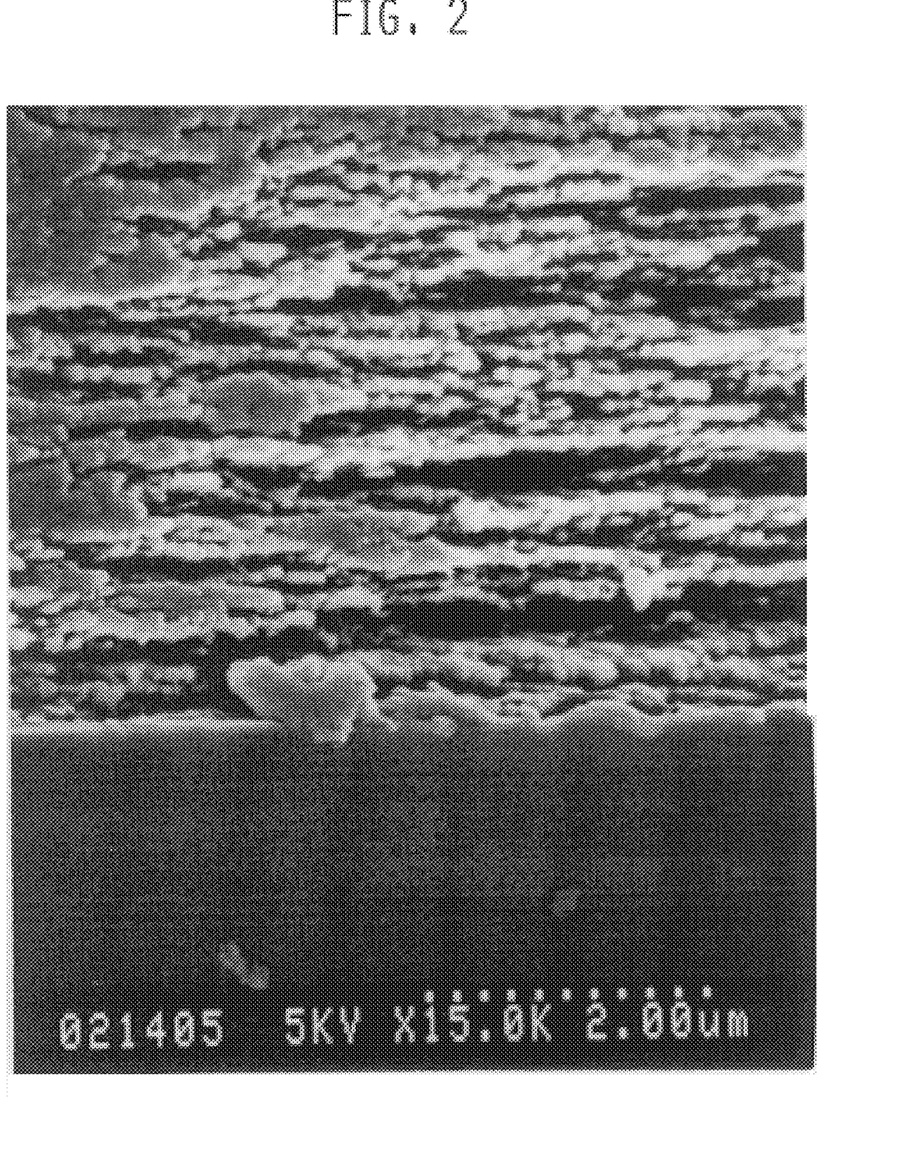
FIG. 2 is an electron photomicrograph (photo in lieu of drawing) showing a sectional view of the porous film of Example 1.
Figure 3:
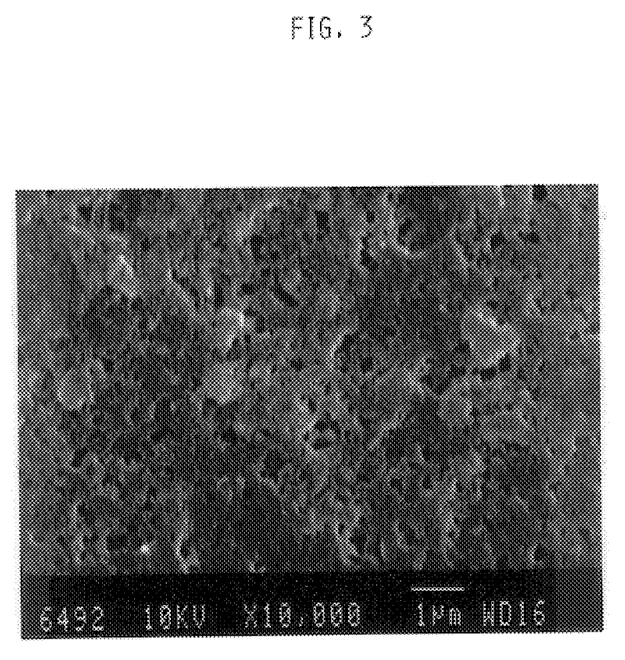
FIG. 3 is an electron photomicrograph (photo in lieu of drawing) showing a top view or surface of the porous film of Example 1.
Figure 4:
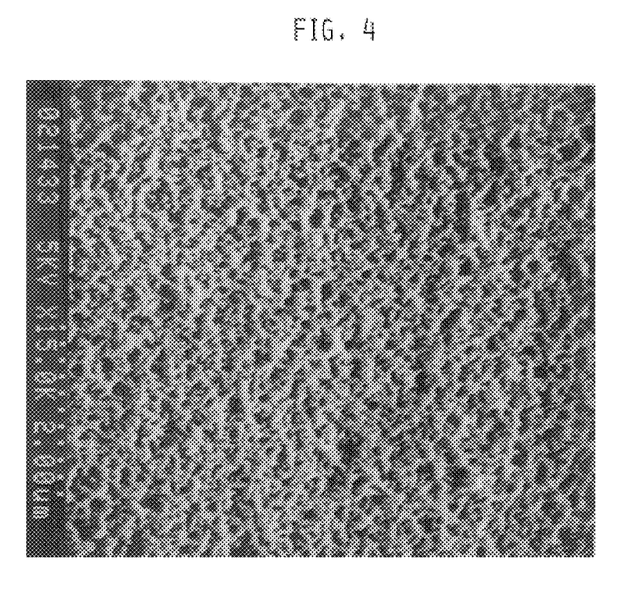
FIG. 4 is an electron photomicrograph (photo in lieu of drawing) showing a top view or surface of the porous film of Example 7.

As shown in FIG. 1, this recording sheet comprises a substrate 1, an ink-absorbing layer 2 formed on at least one side of the substrate, and a porous layer 3 formed on the ink-absorbing layer and having pores 4. The image-accepting layer of the above-mentioned recording sheet is constituted with the ink-absorbing layer 2 and the porous layer 3.

Any of those substrates mentioned hereinabove can be used as the substrate. The thickness of the substrate can be selected according to the intended use and, generally, it is about 5 to 250 $\mu$m, preferably about 10 to 200 $\mu$m. The thickness of an OHP film is, for example, about 50 to 200 $\mu$m.

The ink-absorbing layer formed on at least one side of the above-mentioned substrate is not particularly limited, provided that it comprises a material capable of absorbing ink. The ink-absorbing layer can be composed of a polymer. The polymer includes, among others, naturally-occurring polymers or derivatives thereof, cellulose derivatives, olefinic polymers, acrylic polymers, styrenic polymers, vinyl-series polymers (vinyl acetate-series polymers, vinyl ether-series polymers, etc.), vinyl alcohol- series polymers, polyalkylene oxides, polyesters, polyamides, polycarbonates, polyurethanes, polysulfones, and epoxide-derived polymers. These polymers may have hydrophilic groups (acidic groups such as carboxyl and sulfo groups or salts thereof, basic groups or salts thereof).

In particular, the ink-absorbing layer is preferably a coated layer of a hydrophilic polymer such as a water-soluble polymer, or a water-insoluble but water-absorbable polymer (hydrophilic polymer).

As the hydrophilic polymer such as the water-soluble polymer or the water-insoluble polymer which can nevertheless absorb water, there may be mentioned hydrophilic naturally-occurring polymers or derivatives thereof (starch, cornstarch, sodium alginate, gum arabic, gelatin, casein, dextrin, etc.), cellulose derivatives (methylcellulose, ethylcellulose, hydroxyethylcellulose, carboxymethylcellulose, cellulose sulfate, cyanoethylcellulose, etc.), vinyl alcohol-series polymers (polyvinyl alcohol, ethylene-vinyl alcohol copolymer, etc.), ethylenic polymers (ethylene-maleic anhydride copolymer, etc.), vinyl acetate-series copolymers (vinyl acetate-methyl acrylate copolymer, etc.), polyethylene oxide, carboxyl group- or sulfonic acid group-containing polymers or salts thereof [acrylic polymers [poly(meth)acrylic acid or salts thereof (ammonium salt, alkali metal salts such as sodium salt), methyl methacrylate-(meth)acrylic acid copolymer, acrylic acid-polyvinyl alcohol copolymer, etc.], vinyl ether-series polymers (polyvinyl alkyl ethers such as polyvinyl methyl ether and polyvinyl isobutyl ether, methyl vinyl ether-maleic anhydride copolymer, etc.), styrenic polymers (styrene-maleic anhydride copolymer, styrene-(meth)acrylic acid copolymer, polystyrenesulfonic acid sodium salt, etc.), polyvinylsulfonic acid sodium salt, etc.], nitrogen-containing polymers (or cationic polymers) or salts thereof (quaternary ammonium salts such as polyvinylbenzyltrimethylammonium chloride and polydiallyldimethylammonium chloride, polydimethylaminoethyl (meth)acrylate hydrochloride, polyvinylpyridine, polyvinylimidazole, polyethyleneimine, polyamidepolyamines, polyacrylamide, polyvinylpyrrolidone, etc.), water-dispersible polymers (e.g. acrylic resin emulsions, ethylene-vinyl acetate copolymer emulsions, vinyl acetate-series emulsions, styrene-butadiene copolymer latexes, acrylonitrile-butadiene-styrene copolymer latexes, polyester emulsions, etc.) and the like. These hydrophilic polymers can be used either singly or in combination.

Preferred among these polymers are cellulose derivatives (in particular hydroxyethylcellulose, etc.), vinyl alcohol-series polymers (in particular polyvinyl alcohol, etc.), vinyl-series polymers (in particular vinyl acetate-series copolymers, etc.), polyvinylpyrrolidone and the like. Particularly preferred are vinyl acetate-series copolymers such as a vinyl acetate-methyl acrylate copolymer.

The vinyl acetate-series copolymers are copolymers of vinyl acetate and one or more other copolymerizable monomers and include partially saponified products derived therefrom (e.g. partially saponified products with a degree of saponification of about 10 to 90%). As the copolymerizable monomers, there may be mentioned, for example, olefins or dienes (ethylene, propylene, butadiene, etc.), maleic acid dialkyl esters, (meth)acrylic monomers [alkyl (meth) acrylates such as methyl (meth)acrylate, ethyl (meth) acrylate and butyl (meth)acrylate, hydroxy-containing (meth)acrylates such as 2-hydroxyethyl (meth)acrylate and 2-hydroxypropyl (meth)acrylate, amino group-containing acrylates such as N,N-diethylaminoethyl (meth)acrylate, epoxy group-containing acrylates such as glycidyl (meth) acrylate, amide group-containing monomers such as (meth) acrylamide, cyanovinyls or vinyl cyanides such as (meth) acrylonitrile, etc.], allyl-series monomers (allyl alcohol, allyl isocyanate, epoxy group-containing monomers such as allyl glycidyl ether, etc.), sulfo- or sulfonate salt-containing monomers (styrenesulfonic acid and sodium salt thereof, etc.), carboxyl- or carboxylate salt-containing monomers ((meth)acrylic acid, crotonic acid, monoalkyl maleates and other carboxylic acids or salts thereof (sodium salt, etc.), acid anhydride group-containing monomers (maleic anhydride, etc.), vinyl-series monomers (vinyl isocyanate, aromatic vinyl monomers such as styrene, heterocyclic vinylamines such as vinylpyrrolidone and viriylimidazole, vinyl ethers such as vinyl methyl ether, vinyl ethyl ether and vinyl isobutyl ether, vinyltrisalkoxysilanes, halogen-containing vinyl monomers such as vinyl chloride and vinylidene chloride, etc.), etc. These copolymerizable monomers can be used either alone or as a combination of two or more.

Preferred copolymerizable monomers include hydrophilic monomers having a hydrophilic group (e.g. carboxyl group, sulfonic acid group or salts thereof, hydroxyl group, ether group). In particular, use can be made of vinyl monomers having an ether group, especially an oxyalkylene unit, for example (meth)acrylic acid esters or allyl ether having about 1 to 100, preferably about 2 to 80 (e.g. 5 to 80), more preferably about 5 to 70 (e.g. 10 to 50) of an alkylene oxide unit (added moles).

The oxyalkylene unit-containing vinyl monomers include, among others, diethylene glycol mono(meth)acrylate, triethylene glycol mono(meth)acrylate, polyethylene glycol mono(meth)acrylate, dipropylene glycol mono(meth)acrylate, tripropylene glycol mono(meth)acrylate, polypropylene glycol mono(meth)acrylate, diethylene glycol mono(meth)allyl ether, triethylene glycol mono(meth) allyl ether, polyethylene glycol mono(meth)allyl ether, dipropylene glycol mono(meth)allyl ether, tripropylene glycol mono(meth)allyl ether, and polypropylene glycol mono(meth)allyl ether. These vinyl monomers may be used either singly or in combination. Preferred monomers include those (meth)acrylates which are vinyl monomers containing oxyethylene units as the oxyalkylene unit, and, in particular, polyoxyalkylene (meth)allyl ethers (especially polyoxyethylene allyl ether).

The proportion of the copolymerizable monomer or monomers can be selected within the range in which the sharpness of images and the water resistance are not adversely affected. For example, the proportion is about 0.1 to 50 mole %, preferably about 1 to 30 mole %, and more preferably about 2.5 to 25 mole % (e.g. 3 to 20 mole %), on the whole monomer basis.

Copolymers of vinyl acetate and a polyoxylalkylene-containing vinyl monomer (modified vinyl acetate-series resins) can be obtained commercially, for example from Nippon Synthetic Chemical Industry Co., Ltd. under the trademark "OKS-7158G", etc.

Other preferred polymers include epoxy-containing hydrophilic polymers. The epoxy group-containing hydrophilic polymers may be either (1) homo- or copolymers having an epoxy group-containing monomer unit or (2) epoxidized resins produced by epoxidation of resins. As the epoxy group-containing monomer, there may be mentioned, for example, allyl glycidyl ether, glycidyl methacrylate, glycidyl acrylate, methallyl glycidyl ether, 1-allyloxy-3,4-epoxybutane, 1-(3-butenyloxy)-2,3-epoxypropane, and 4-vinyl-1-cyclohexene-1,2-epoxide. These epoxy-containing monomers can be used either alone or in combination. Preferred epoxy-containing monomers include allyl glycidyl ether, glycidyl (meth)acrylate and the like.

Usable as the comonomer copolymerizable with such epoxy-containing monomers are vinyl acetate and the above-mentioned copolymerizable monomers, in particular vinyl esters (vinyl acetate, etc.), vinylpyrrolidone, (meth) acrylic monomers ($C_{1-8}$ alkyl (meth)acrylates, etc.), and carboxyl- or carboxylate salt-containing monomers ((meth) acrylic acid or salts thereof, etc.). The vinyl ester units in the above-mentioned polymers may be hydrolyzed to constitute vinyl alcohol units.

The epoxy-containing monomers are used in an amount (content) of about 0.01 to 10 mole % (e.g. 0.01 to 5 mole %), preferably about 0.1 to 3 mole % (e.g. 0.2 to 2.5 mole %), particularly about 0.2 to 2 mole %, based on the total amount of monomers.

In the above-mentioned epoxy-containing resins (2), the epoxidation of hydrophilic polymers can be carried out, for example, by a process comprising reacting a water-absorbable or water-soluble polymer containing an active hydrogen atom (e.g. hydroxyl, amino, carboxyl groups or the like) with epichlorohydrin, thereby introducing an epoxy group.

The amount of the introduced epoxy group is, as above, about 0.01 to 10 mole % (e.g. 0.01 to 5 mole %), preferably about 0.1 to 3 mole % (e.g. 0.2 to 2.5 mole %), more preferably about 0.2 to 2 mole %, based on the total amount of the polymer.

Preferred epoxy-containing polymers comprise, for example, at least one member selected from the group consisting of polyvinyl alcohol, polyvinylpyrrolidone, and water-soluble acrylic resins (e.g. poly(meth)acrylic acid or salts thereof, $C_{1-8}$ alkyl (meth)acrylate-(meth)acrylic acid copolymers or salts thereof, other carboxyl-containing (meth)acrylic resins or salts thereof).

For an enhanced water resistance, a crosslinking agent may be added to the above-mentioned ink-absorbing layer. As the crosslinking agent, there may be mentioned organic crosslinking agents [amino resins (urea resins, guanamine resins, melamine resins, etc.), epoxy-series compounds, amine compounds [aliphatic, alicyclic or aromatic diamines or polyamines such as ethylenediamine, hexamethylenediamine, polyoxyalkylene-type diamines or polyamines (i.e. polyether-type diamines or polyamines)], polycarboxylic acids or acid anhydrides, polyisocyanates, blocked polyisocyanates, etc.], and inorganic crosslinking agents [boric acid or borate (borax, etc.), zirconium compounds (e.g. halides, salts with inorganic acids such as sulfuric acid or with organic acids such as acetic acid, etc.), titanium compounds (e.g. alkoxides such as tetraethoxytitanium, etc.), aluminum compounds (e.g. alkoxides such as trimethoxyaluminum, etc.), phosphorus compounds (e.g. phosphite esters, bisphenol A-modified polyphosphoric acid, etc.), silane coupling agents (silicone compounds containing a reactive functional group such as alkoxy or glycidyl), etc.], among others. These crosslinking agents may be used either singly or in combination.

Among these crosslinking agents, polyisocyanates are used frequently. When epoxy group-containing polymers are used, practical use may be made of epoxy-curing agents such as polycarboxylic acids or acid anhydrides and amines (primary or secondary amines, etc.).

The amount of the crosslinking agents can be selected according to the polymer species. For example, it is about 0.01 to 20 parts by weight, preferably about 0.1 to 10 parts by weight, more preferably about 1 to 5 parts by weight, per 100 parts by weight of the polymer.

The ink-absorbing layer may also be constituted with a powder (pigment, etc.) and a binder resin. Specific examples of the powder are inorganic powders [e.g. white carbon, finely divided calcium silicate, zeolite, magnesium aluminosilicate, calcined diatomaceous earth, finely divided magnesium carbonate, finely divided alumina, porous powders or pigments such as sea urchin-like or spherical light calcium carbonate resulting from aggregation of a plurality of unit particles, talc, kaolin, clay, delaminated kaolin, heavy calcium carbonate, light calcium carbonate, magnesium carbonate, titanium dioxide, aluminum hydroxide, calcium hydroxide, magnesium hydroxide, magnesium silicate, calcium sulfate, sericite, bentonite, smectite, and other mineral powders], and organic powders [e.g. crosslinked or uncrosslinked organic fine powders such as polystyrene resins, acrylic resins, urea resins, melamine resins and benzoguanamine resins, other orgsnic powders including fine hollow particles]. These powders may be used alone, or two or more of them may be appropriately selected for combined use.

As the binder resin, use can be made of the water-soluble or hydrophilic polymers mentioned above.

The ratio between the powder and the binder resin can be selected according to the handling or operation characteristics of the resulting coating composition (e.g. viscosity, fluidity) and the characteristics of the resulting ink-absorbing layer (e.g. ink absorption, ink bleeding). The amount of the powder is about 0.1 to 80 parts by weight, and preferably about 0.2 to 50 parts by weight, per 100 parts by weight of the binder resin.

The thickness of the ink-absorbing layer can be selected according to the intended use and is, for example, about 5 to 50 $\mu$m, preferably about 10 to 30 $\mu$m, and generally about 5 to 30 $\mu$m.

The porous layer formed on the ink-absorbing layer is not particularly limited provided that it is wettable with a water-color ink or aqueous ink and that the water-color ink can penetrate into pores thereof. As mentioned above, the porous layer may comprise various polymers.

A preferred porous layer has high wettability for the water-color ink and has a hydrophilic surface sufficient to allow penetration of the water-color ink into pores. Such a porous layer can be constituted with a hydrophilic polymer or a polymer rendered hydrophilic by appropriate treatment. The term "hydrophilic polymer or polymer rendered hydrophilic" means that the polymer has a contact angle of less than 80° (preferably about 0 to 60°, especially about 0 to 40°). The contact angle is the angle between the polymer surface and the tangent touching a waterdrop at the point of intersection of the waterdrop surface and the polymer surface as measured at room temperature after stopping of the waterdrop spreading over the polymer surface.

As the hydrophilic polymer, use can be made of the polymers mentioned above (hydrophilic polymers as exemplified in connection with the ink-absorbing layer, polymers for the porous membrane). The hydrophilic polymer includes, more specifically, cellulose derivatives, vinyl-series polymers [(meth)acrylonitrile-series polymers, (meth) acrylic polymers, polyvinylpyrrolidone, polyvinyl acetate and completely or partially saponified products thereof (polyvinyl alcohol, etc.), ethylene-vinyl acetate copolymers and completely or partially saponified products thereof, polyalkyl vinyl ethers, carboxyl group-containing polymers or salts thereof, etc.], polyalkylene oxides (polyethylene glycol, etc.), polyamides, polyethyleneimine, polysulfones, polyethersulfones, etc. These hydrophilic polymers may be used alone or in combination of two or more.

Additionally, hydrophobic polymers inclusive of olefinic resin such as polyethylene and polypropylene, sytrenic resins such as polystyrene, and fluororesins can be made hydrophilic on its surface, too, by addition of or coating with a surfactant, a wetting agent or the like, or by such treatment as plasma treatment or corona discharge treatment. Such hydrophobic polymers rendered hydrophilic are also included among the above-mentioned hydrophilic polymers.

In the recording sheet, the mean pore size of the porous layer may be, for example, about 0.001 to 10 $\mu$m (e.g. 0.005 to 10 $\mu$m), preferably about 0.005 to 5 $\mu$m (e.g. 0.01 to 5 $\mu$m), and more preferably about 0.005 to 2.5 $\mu$m (e.g. 0.005 to 1 $\mu$m). The ink absorption of a recording sheet cannot be improved so much, when the mean pore size is less than 0.001 $\mu$m. But when the mean pore size exceeds 10 $\mu$m, the water resistance and printing quality may be likely to deteriorate.

The porous layer may be transparent, semitransparent, or opaque. A highly transparent porous layer has a maximum pore size of 0.4 $\mu$m or less, and a mean pore size of about 0.01 to 0.35 $\mu$m (e.g. 0.04 to 0.3 $\mu$m), preferably about 0.05 to 0.3 $\mu$m (e.g. 0.05 to 0.2 $\mu$m), and more preferably about 0.07 to 0.2 $\mu$m.

The recording sheet provided with the highly transparent porous layer shows a light transmittance, at the wavelength of 400 nm, of not less than 55% (i.e. 55 to 100%), preferably about 60 to 100%, more preferably about 70 to 100%, and especially about 75 to 100%. A highly transparent recording sheet with a light transmittance of about 80 to 100% is also obtainable, which is useful as an OHP sheet.

The porosity of the porous layer can be chosen in accordance with the ink absorption, and is, for example, about 10 to 70% (e.g. 10 to 65%), preferably about 15 to 65% (e.g. 15 to 50%), and more preferably about 20 to 60% (e.g. 20 to 45%).

The thickness of the porous layer is selected in accordance with its intended use. For example, the thickness is about 1 to 100 µm, preferably about 3 to 50 µm, and particularly about 3 to 20 µm. Sufficient water resistance cannot be ensured in a porous layer with a thickness of less than 1 µm. The transparency or ink absorption can be deteriorated in a porous layer with a thickness of over 100 µm.

[Process for Producing the Recording Sheet]

The recording sheet can be obtained by forming the ink-absorbing layer and the porous layer, in that order, on at least one side of the substrate mentioned above. The ink-absorbing layer can be formed by applying a coating composition containing the above-mentioned ink-absorbing polymer (hydrophilic polymer) to the substrate, followed by drying. The coating composition for forming the ink-absorbing layer comprises the above polymer (hydrophilic polymer, etc.) and a solvent (water or an organic solvent), and may contain one or more additives to be mentioned below. The porous layer can be formed by utilizing the dry phase conversion method as mentioned above.

In the coating composition for the dry phase conversion method, the proportion between the good solvent and the poor solvent is not strictly limited provided that a homogeneous solution containing polymers is obtainable. The proportion of the poor solvent, relative to 100 parts by weight of the good solvent, can be usually selected from a range of about 1 to 100 parts by weight, preferably about 2 to 75 parts by weight, and more preferably about 3 to 60 parts by weight (e.g. 10 to 50 parts by weight). As the proportion of the poor solvent becomes larger, the porous layer is more likely to get opaque. For the formation of a highly transparent porous layer, the proportion of the poor solvent, relative to 100 parts by weight of the good solvent, is generally about 1 to 50 parts by weight (e.g. 3 to 50 parts by weight), preferably about 2 to 40 parts by weight (e.g. 5 to 40 parts by weight), more preferably about 3 to 35 parts by weight (e.g. 10 to 35 parts by weight), and practically about 3 to 30 parts by weight.

In addition, the content of the polymer in the coating composition is as mentioned above.

The coating composition for forming the ink-absorbing layer and/or the porous layer may contain one or more conventional additives selected from antifoams, coating improvers, thickeners, lubricants, stabilizers (antioxidants, ultraviolet absorbers, heat stabilizers, etc.), antistatic agents, pigments, antiblocking agents and so forth unless the addition thereof should impair the characteristics of the ink-absorbing layer and/or the porous layer.

The recording sheet is especially useful as a recording sheet in the ink jet recording system where a record or image can be formed by flying droplets of ink. It is also useful as a printing sheet (in particular as a water ink printing sheet) in offset printing or flexographic printing, among others.

The recording sheet of the present invention is excellent in ink absorption, water resistance and antiblocking property and good in sharpness of images (quality of printing), hence being suitable for use in recording by the ink jet technique. Additionally, the recording sheet, having the porous layer on the one hand and being highly transparent on the other, is advantageous in use for the OHP (overhead projector).

EXAMPLES

The following examples illustrate the present invention in further detail. They are, however, by no means limitative of the scope of the present invention.

In the examples, the transparency, the mean pore size and the porosity were evaluated as follows.

[Transparency]

The light transmittance at the wavelength of 400 nm was measured using a spectrophotometer [Hitachi Ltd., model U-3300 spectrophotometer] and used as an index of transparency.

[Mean Pore Size and Porosity]

In an electron photomicrograph of the surface, taken at a magnification of 5,000, three sites each with a specified area (2 cm×2 cm) were processed on an image processing apparatus. The sizes of the pores in the surface electron photomicrograph were measured with each pore being regarded as a true circle. The values were averaged to give the mean pore size.

The porosity (%) was calculated according to the calculation formula (whole pore area/measured area)×100.

Example 1

A dope was prepared by adding 23.8 parts by weight of cyclohexanol to 100 parts by weight of an 8% (by weight) solution of cellulose acetate (degree of acetylation 55%, viscosity average degree of polymerization 170) in methylcellosolve with well stirring. The dope was applied to a release paper in such a manner as to give a 30 µm layer after dried. The coated paper was dried at 35° C. and 90% RH for 5 minutes and further dried at 100° C. for 2 minutes. The film peeled off from the release paper was a porous film having a mean pore size of 0.08 µm and a porosity of 32%. The light transmittance was 82%, indicating high transparency of the film.

Example 2

A dope was prepared by adding 4.8 parts by weight of cyclohexanol to 100 parts by weight of a 10% (by weight) solution of cellulose acetate (degree of acetylation 55%, viscosity average degree of polymerization 180) in methylcellosolve with well stirring. The dope was applied to a release paper in such a manner as to give a 50 µm layer when dried. The coated paper was dried at 25° C. and 90% RH for 10 minutes and then dried at 120° C. for 3 minutes. The film peeled off from the release paper was a porous film having a mean pore size of 0.10 µm and a porosity of 45%. The light transmittance was 73%, indicating high transparency of the film.

Example 3

A dope was prepared by adding 13.7 parts by weight of 4-methylcyclohexanol to 100 parts by weight of an 8% (by weight) solution of cellulose acetate (degree of acetylation 55%, viscosity average degree of polymerization 170) in methylcellosolve with well stirring. The dope was applied to a release paper in such a manner as to give a 30 µm layer when dried. The coated paper was dried at 25° C. and 90% RH for 5 minutes and further dried at 120° C. for 3 minutes. The film peeled off from the release paper was a porous film having a mean pore size of 0.07 µm and a porosity of 33%. The light transmittance was 81%, indicating high transparency of the film.

Example 4

A dope was prepared by adding 9.2 parts by weight of 3,5-dimethylcyclohexanol to 100 parts by weight of an 8%

(by weight) solution of cellulose acetate (degree of acetylation 55%, viscosity average degree of polymerization 170) in methylcellosolve with thorough stirring. The dope was applied to a release paper in such a manner as to give a 30 μm layer when dried. The coated paper was dried at 25° C. and 90% RH for 5 minutes and further dried at 120° C. for 3 minutes. The film peeled off from the release paper was a porous film having a mean pore size of 0.08 μm and a porosity of 35%. The light transmittance was 78%, indicating high transparency of the film.

Example 5

The dope prepared in Example 1 was applied to a polyethylene terephthalate film to give a coating in a thickness, after dried, of 5 μm. The coated film was dried at 35° C. and 90% RH for 5 minutes and then dried at 100° C. for 30 seconds. The film obtained was a laminate film having, on its surface, a porous layer with a mean pore size of 0.08 μm and a porosity of 28%. The light transmittance was 80%, indicating high transparency of the film.

Example 6

A dope was prepared by adding 15 parts by weight of cyclohexanol to 100 parts by weight of a 10% (by weight) solution of cellulose acetate (degree of acetylation 44%, viscosity average degree of polymerization 110) in methylcellosolve with thorough stirring. The dope was applied to a polyethylene terephthalate film to give a porous layer in a thickness, after dried, of 5 μm. The coated film was dried at 25° C. and 90% RH for 10 minutes and then dried at 100° C. for 30 seconds. Further, a polyethylene terephthalate film coated with a transparent adhesive was affixed to the porous layer to give a laminate film. The porous layer had a mean pore size of 0.08 μm and a porosity of 32%. The laminate film showed a light transmittance of 78%, thus being highly transparent.

Comparative Example 1

An 18% (by weight) solution of a polyethersulfone in dimethyl sulfoxide was applied to a glass plate to give a coating in a thickness, after dried, of 30 μm. The coated glass plate was immersed in water at 25° C. for 1 minute. The film, peeled off from the glass plate and air-dried, had an unsymmetrical structure comprising a dense surface layer and a porous underlying layer having pores 2 to 7 μm in size. The film was white and opaque.

Comparative Example 2

A 14% (by weight) solution of an acrylonitrile-N-vinylpyrrolidone copolymer (mole ratio 98:2; "DUY", product of Daicel Chemical Industries, Ltd.) in dimethyl sulfoxide was applied to a glass plate to give a coating in a thickness, after dried, of 30 μm. The coated glass plate was immersed in water at 25° C. for minute. The film, peeled off from the glass plate and air-dried, had an unsymmetrical structure comprising a dense surface layer and a porous underlying layer having pores 1 to 5 μm in size. The film was white and opaque.

Example 7

A dope was prepared by adding 15 parts by weight of 3-methoxybutyl acetate to 100 parts by weight of a 13% (by weight) solution of a polyacrylonitrile-N-vinylpyrrolidone copolymer (mole ratio 98:2; "DUY", product of Daicel Chemical Industries, Ltd.) in N,N-dimethylformamide with well stirring. The dope was applied to a release paper in such a manner as to give, after dried, a coating of 30 μm. The coated paper was dried at 70° C. and 90% RH for 1.5 minutes and further dried at 120° C. for 3 minutes. The film peeled off from the release paper was a porous film having a mean pore size of 0.3 μm and a porosity of 52%. The light transmittance was 40%, which meant the film had good transparency. The above procedure was followed using, in lieu of the release paper, a polyethylene terephthalate (PET) film coated with polyvinyl alcohol. The results were similar to the above.

Example 8

A dope was prepared by adding 15 parts by weight of 3-methoxybutyl acetate to 100 parts by weight of a 13% (by weight) solution of a polyacrylonitrile-methyl acrylate copolymer (mole ratio 95:5; "PAN-A", product of Toyobo Co.) in N,N-dimethylformamide with well stirring. The dope was applied to a release paper to give, when dried, a coating in a thickness of 30 μm. The coated paper was dried at 70° C. and 90% RH for 1.5 minutes and further dried at 120° C. for 3 minutes. The film peeled off from the release paper was a porous film having a mean pore size of 0.2 μm and a porosity of 33%. The light transmittance was 40%, which meant the film had good transparency.

Example 9

A dope was prepared by adding 15 parts by weight of 3-methoxybutyl acetate to 100 parts by weight of a 13% (by weight) solution of a polyacrylonitrile-vinyl acetate-diethylaminoethyl methacrylate copolymer (mole ratio 89:8:3; "PAN-C", product of Toyobo Co.) in N,N-dimethylformamide with thorough stirring. The dope was applied to a release paper to give, after dried, a coating of 30 μm. The coated paper was dried at 70° C. and 90% RH for 1.5 minutes and further dried at 120° C. for 3 minutes. The film peeled off from the release paper was a porous film having a mean pore size of 0.01 μm and a porosity of 10%. The light transmittance was 41%, which meant the film had good transparency.

Example 10

A dope was prepared by adding 15 parts by weight of 2-butoxyethanol to 100 parts by weight of a 13% (by weight) solution of an acrylonitrile-N-vinylpyrrolidone copolymer (mole ratio 98:2; "DUY", product of Daicel Chemical Industries, Ltd.) in N,N-dimethylformamide with well stirring. The dope was applied to a release paper to give a coating of 30 μm when dried. The coated paper was dried at 70° C. and 90% RH for 1.5 minutes and further dried at 120° C. for 3 minutes. The film peeled off from the release paper was a porous film having a mean pore size of 0.08 μm and a porosity of 48%. The light transmittance was 39%, which meant the film had good transparency.

Example 11

The procedure of Example 7 was followed except that the dope applied was dried at a temperature of 50° C. and a humidity of 90% RH for 1.5 minutes and then dried at 120° C. for 3 minutes. Thus obtained was a porous film which had a mean pore size of 0.1 μm, a porosity of 30%, and a light transmittance of 36%.

Comparative Example 3

A coating composition (dope) was prepared by adding 2.6 parts by weight of 1,2-diethoxyethane to 100 parts by weight of a 15% (by weight) solution of a polysulfone ("P-1700", product of Udel Co.) in 1,4-dioxane with thorough stirring. The coating composition was applied to a PET film coated with polyvinyl alcohol, in an amount sufficient to give the resulting film a thickness of 30 μm. The coated film was dried at 25° C. and 95% RH for 5 minutes and further dried at 120° C. for 3 minutes.

The film thus obtained was a porous film with a mean pore size of 3 μm and a porosity of 32%. Its light transmittance was 2%.

Example 12

A dope was prepared by adding 15 parts by weight of 3-methoxybutyl acetate to 100 parts by weight of a 13% (by weight) solution of a polymethyl methacrylate (product of Scientific Polymer Products) in N,N-dimethylformamide with thorough stirring. The dope was applied to a release paper in such a manner as to give, when dried, a coating of 30 μm. The coated paper was dried at 60° C. and 95% RH for 1.5 minutes and then at 120° C. for 3 minutes. The film peeled off from the release paper was a porous film having a mean pore size of 0.15 μm and a porosity of 45%. The light transmittance was 75%, indicating high transparency of the film.

Example 13

A dope was prepared by adding 15 parts by weight of 3-methoxybutyl acetate to 100 parts by weight of a 14% (by weight) solution of a polyethersulfone (product of Sumitomo Chemical Company, Ltd.) in N,N-dimethylformamide with thorough stirring. The dope was applied to a release paper in such a manner as to give, when dried, a coating of 30 μm. The coated paper was dried at 60° C. and 95% RH for 1.5 minutes and then at 120° C. for 3 minutes. The film peeled off from the release paper was a porous film having a mean pore size of 0.05 μm and a porosity of 30%. The light transmittance was 80%, indicating high transparency of the film.

[Evaluation as Recording Sheet]

The laminate films obtained in the following examples and comparative examples were examined for the following recording sheet characteristics.

Image records were formed on the recording sheets obtained by allover printing in cyan, yellow, magenda and black using an ink jet printer (Canon Inc., model BJC-420J).

[Ink Absorption]

After printing, a sheet of copying paper for a copying machine (plane Paper Copier, PPC) was placed on the printed portion at timed intervals, and a load (250 g/cm$^2$) was imposed on the copying paper for 10 seconds. The copying paper was peeled off and visually examined for the degree of ink transfer to the back. The ink absorption was evaluated in terms of the time until no more ink transfer to the back was observed.

[Water Resistance]

After printing, the printed portion was wiped with a water-impregnated swab by moving it back and forth three times and the extent of ink removal was evaluated according to the following criteria.
◎ No change
○ Slight ink removal fading the printed portion
X Complete removal of the wiped printed portion

[Image Sharpness]

After a printing of a yellow base and a magenta line (100 μm wide) on the base, dots were observed under a microscope at a magnification of 50 and evaluated according to the following criteria.

◎ Little blurring of dots
○ Slight blurring of dots, the actually measured width being greater than 120 μm
X Blurring of dots, the boundary between neighboring yellow and magenta dots being undiscerned

[Blocking Resistance]

At least two recording sheets were piled up and allowed to stand for one day under a load (40 g/cm$^2$) at a temperature of 40° C. and a humidity of 90% RH. The blocking resistance was evaluated according to the following criteria.
◎ No matting nor blocking
○ Matting observable but no blocking
X Blocking Example 14

A 15 μm thick ink-absorbing layer was formed on a 100 μm thick polyethylene terephthalate film (Melinex 705; product of ICI Japan) which was already treated for facilitating adhesion, by applying thereto a 15% (by weight) aqueous solution of a modified vinyl acetate-series copolymer (OKS-7158G; product of Nippon Synthetic Chemical Industry Co., Ltd.), followed by drying at 120° C. for 3 minutes. A coating composition (dope) was prepared by adding 23.8 parts by weight of cyclohexanol to 100 parts by weight of an 8% (by weight) solution of cellulose acetate (mean degree of acetylation 55, viscosity average degree of polymerization 170) in methylcellosolve. This coating composition was applied onto the ink-absorbing layer and dried in an atmosphere of a temperature of 35° C. and a humidity of 90% RH for 5 minutes and then at 120° C. for 3 minutes, to give a porous layer having a mean pore size of 0.08 μm, a porosity of 32% and a thickness of 5 μm.

The thus obtained recording sheet had a light transmittance of 78% at the wavelength of 400 nm, exhibiting excellent transparency.

Example 15

A 15 μm thick ink-absorbing layer was formed on a 100 μm thick polyethylene terephthalate film (Melinex 705; product of ICI Japan) which was already treated for facilitating adhesion, by applying thereto a 15% (by weight) aqueous solution of a modified vinyl acetate-series copolymer (OKS-7158G; product of Nippon Synthetic Chemical Industry Co., Ltd.), followed by drying at 120° C. for 3 minutes. A coating composition (dope) was prepared by adding 45 parts by weight of cyclohexanol to 100 parts by weight of an 8% (by weight) solution of cellulose acetate (mean degree of acetylation 55, viscosity average degree of polymerization 170) in methylcellosolve. This coating composition was applied onto the ink-absorbing layer and dried in an atmosphere of a temperature of 35° C. and a humidity of 90% RH for 5 minutes and then at 120° C. for 3 minutes, to give a white porous membrane having a mean pore size of 1.1 μm, a porosity of 55% and a thickness of 5 μm.

Comparative Example 4

A 15 μm thick ink-absorbing layer was formed on a 100 μm thick polyethylene terephthalate film (Melinex 705; product of ICI Japan) already treated for facilitating adhesion, by applying thereto a 15% (by weight) aqueous solution of a modified vinyl acetate-series copolymer (OKS-7158G; product of Nippon Synthetic Chemical Industry Co., Ltd.), followed by drying at 120° C. for 3 minutes.

Example 16

A 10 μm thick ink-absorbing layer was formed on a 100 μm thick polyethylene terephthalate film (Melinex 705;

product of ICI Japan) which was already treated for facilitating adhesion, by applying thereto a 10% (by weight) aqueous solution of polyvinylpyrrolidone (weight average molecular weight: 360,000), followed by drying at 120° C. for 3 minutes. A coating composition (dope) was prepared by adding 13.7 parts by weight of 4-methylcyclohexanol to 100 parts by weight of an 8% (by weight) solution of cellulose acetate (mean degree of acetylation 55, viscosity average degree of polymerization 170) in methylcellosolve. This coating composition was applied onto the ink-absorbing layer and dried in an atmosphere of a temperature of 25° C. and a humidity of 90% RH for 5 minutes and then at 120° C. for 3 minutes, to give a porous layer having a mean pore size of 0.07 $\mu$m, a porosity of 33% and a thickness of 7 $\mu$m.

The resulting recording sheet had a light transmittance of 78% at the wavelength of 400 nm, showing excellent transparency.

Example 17

A 10 $\mu$m thick ink-absorbing layer was formed on a 100 $\mu$m thick polyethylene terephthalate film (Melinex 705; product of ICI Japan) already treated for facilitating adhesion, by applying thereto a 10% (by weight) aqueous solution of polyvinylpyrrolidone (weight average molecular weight: 360,000), followed by drying at 120° C. for 3 minutes. A coating composition (dope) was prepared by adding 45.5 parts by weight of cyclohexanol to a solution composed of 2 parts by weight of cellulose acetate (mean degree of acetylation 44, viscosity average degree of polymerization 110), 8 parts by weight of cellulose acetate (mean degree of acetylation 55, viscosity average degree of polymerization 180) and 90 parts by weight of methylcellosolve. This coating composition was applied onto the Ink-absorbing layer and dried in an atmosphere of a temperature of 25° C. and a humidity of 90% RH for 10 minutes and then at 120° C. for 3 minutes, to give a white porous layer having a mean pore size of 0.8 $\mu$m, a porosity of 53% and a thickness of 10 $\mu$m.

Comparative Example 5

A 10 $\mu$m thick ink-absorbing layer was formed on a 100 $\mu$m thick polyethylene terephthalate film (Melinex 705; product of ICI Japan) already treated for facilitating adhesion, by applying thereto a 10% (by weight) aqueous solution of polyvinylpyrrolidone (weight average molecular weight: 360,000), followed by drying at 120° C. for 3 minutes.

Example 18

A 10 $\mu$m thick ink-absorbing layer was formed on a 100 $\mu$m thick polyethylene terephthalate film (Melinex 705; product of ICI Japan) already treated for facilitating adhesion, by applying thereto a coating composition prepared by adding 2 parts by weight of a 5% (by weight) aqueous solution of polyoxypropylene-α,ω-diamine (molecular weight: 230) to 100 parts by weight of a 10% (by weight) aqueous solution of a polyvinyl alcohol/allyl glycidyl ether copolymer (hereinafter referred to as "PVA/AGE copolymer"; degree of saponification of PVA portion: 80%; copolymerization composition ratio: PVA/AGE=99.5/0.5 (mole ratio); degree of polymerization: 500), followed by drying at 120° C. for 10 minutes. A coating composition (dope) was prepared by adding 4.8 parts by weight of cyclohexanol to 100 parts by weight of a 10% (by weight) solution of cellulose acetate (mean degree of acetylation 55, viscosity average degree of polymerization 180) in methylcellosolve. This coating composition was applied onto the ink-absorbing layer and dried in an atmosphere of a temperature of 25° C. and a humidity of 90% RH for 10 minutes and then at 120° C. for 3 minutes, to give a porous layer having a mean pore size of 0.10 $\mu$m, a porosity of 45% and a thickness of 10 $\mu$m.

The thus obtained recording sheet had a light transmittance of 71% at the wavelength of 400 nm, thus showing its excellent transparency.

Example 19

A 10 $\mu$m thick ink-absorbing layer was formed on a 100 $\mu$m thick polyethylene terephthalate film (Melinex 705; product of ICI Japan) already treated for facilitating adhesion, by applying thereto a coating composition prepared by adding 2 parts by weight of a 5% (by weight) aqueous solution of polyoxypropylene-α,ω-diamine (molecular weight: 230) to 100 parts by weight of a 10% (by weight) aqueous solution of PVA/AGE copolymer (degree of saponification of PVA portion: 80%; copolymerization composition ratio: PVA/AGE=99.5/0.5 (mole ratio); degree of polymerization: 500), followed by drying at 120° C. for 10 minutes. A coating composition (dope) was prepared by adding 22.3 parts by weight of amyl formate to 100 parts by weight of a 5% (by weight) solution of cellulose acetate (mean degree of acetylation 55, viscosity average degree of polymerization 170) in dimethoxyethane. This coating composition was applied onto the ink-absorbing layer and dried in an atmosphere of a temperature of 25° C. and a humidity of 70% RH for 5 minutes and then at 120° C. for 3 minutes, to give a white porous layer having a mean pore size of 1.5 $\mu$m, a porosity of 60% and a thickness of 5 $\mu$m.

Comparative Example 6

A 10 $\mu$m thick ink-absorbing layer was formed on a 100 $\mu$m thick polyethylene terephthalate film (Melinex 705; product of ICI Japan) already treated for facilitating adhesion, by applying thereto a coating composition prepared by adding 2 parts by weight of a 5% (by weight) aqueous solution of polyoxypropylene-α,ω-diamine (molecular weight: 230) to 100 parts by weight of a 10% (by weight) aqueous solution of PVA/AGE copolymer (degree of saponification of PVA portion: 80%; copolymerization composition ratio: PVA/AGE=99.5/0.5 (mole ratio); degree of polymerization: 500), followed by drying at 120° C. for 10 minutes.

Example 20

A 10 $\mu$m thick ink-absorbing layer was formed on a 100 $\mu$m thick polyethylene terephthalate film (Melinex 705; product of ICI Japan) already treated for facilitating adhesion, by applying thereto a coating composition prepared by adding 1 part by weight of a 5% (by weight) aqueous solution of hexamethylenediamine to 100 parts by weight of a 10% (by weight) aqueous solution of PVA/AGE copolymer (degree of saponification of PVA portion: 80%; copolymerization composition ratio: PVA/AGE=99.5/0.5 (mole ratio); degree of polymerization: 500), followed by drying at 120° C. for 10 minutes. A coating composition (dope) was prepared by adding 9.2 parts by weight of 3,5-dimethylcyclohexanol to 100 parts by weight of an 8% (by weight) solution of cellulose acetate (mean degree of acetylation 55, viscosity average degree of polymerization 170) in methylcellosolve. This coating composition was applied onto the ink-absorbing layer and dried in an atmosphere of a temperature of 25° C. and a humidity of 90% RH for 10 minutes and then at 1200° C. for 3 minutes, to give a porous layer having a mean pore size of 0.08 μm, a porosity of 35% and a thickness of 10 μm.

The obtained recording sheet showed a light transmittance of 76% at the wavelength of 400 nm, thus exhibiting excellent transparency.

Example 21

A 10 μm thick ink-absorbing layer was formed on a 100 μm thick polyethylene terephthalate film (Melinex 705; product of ICI Japan) already treated for facilitating adhesion, by applying thereto a coating composition prepared by adding 1 part by weight of a 5% (by weight) aqueous solution of hexamethylenediamine to 100 parts by weight of a 10% (by weight) aqueous solution of PVA/AGE copolymer (degree of saponification of PVA portion: 80%; copolymerization composition ratio: PVA/AGE=99.5/0.5 (mole ratio); degree of polymerization: 500), followed by drying at 120° C. for 10 minutes. A coating composition (dope) was prepared by adding 36.8 parts by weight of ethyl benzoate to 100 parts by weight of a 5% (by weight) solution of cellulose acetate (mean degree of acetylation 55, viscosity average degree of polymerization 170) in methylcellosolve. This coating composition was applied onto the ink-absorbing layer and dried in an atmosphere of a temperature of 25° C. and a humidity of 80% RH for 10 minutes and then at 130° C. for 10 minutes, to give a white porous layer having a mean pore size of 1.7 μm, a porosity of 58% and a thickness of 7 μm.

Comparative Example 7

A 10 μm thick ink-absorbing layer was formed on a 100 μm thick polyethylene terephthalate film (Melinex 705; product of ICI Japan) already treated for facilitating adhesion, by applying thereto a coating composition prepared by adding 1 part by weight of a 5% (by weight) aqueous solution of hexamethylenediamine to 100 parts by weight of a 10% (by weight) aqueous solution of PVA/AGE copolymer (degree of saponification of PVA portion: 80%; copolymerization composition ratio: PVA/AGE=99.5/0.5 (mole ratio); degree of polymerization: 500), followed by drying at 120° C. for 10 minutes.

Example 22

A 10 μm thick ink-absorbing layer was formed on a 100 μm thick polyethylene terephthalate film (Melinex 705; product of ICI Japan) already treated for facilitating adhesion, by applying thereto an aqueous coating composition having a solid content of 14% by weight as prepared from 100 parts by weight of synthetic noncrystalline silica (Siloid 74, product of Fuji-Davison Chemical Co.), 40 parts by weight of polyvinyl alcohol (PVA-613, product of Kuraray Co., Ltd.) and 20 parts by weight of a cationic resin (Polyfix 601, product of Showa Kobunshi Co., Ltd.), followed by drying at 120° C. for 10 minutes. A coating composition (dope) was prepared by adding 32.4 parts by weight of diisobutyl ketone to 100 parts by weight of an 8% (by weight) solution of cellulose acetate (mean degree of acetylation 55, viscosity average degree of polymerization 170) in methylcellosolve. This coating composition was applied onto the ink-absorbing layer and dried in an atmosphere of a temperature of 25° C. and a humidity of 80% RH for 15 minutes and then at 120° C. for 3 minutes, to give a white porous layer having a mean pore size of 1.8 μm, a porosity of 55% and a thickness of 10 μm.

Comparative Example 8

A 10 μm thick ink-absorbing layer was formed on a 100 μm thick polyethylene terephthalate film (Melinex 705; product of ICI Japan) already treated for facilitating adhesion, by applying thereto an aqueous coating composition having a solid content of 14% by weight as prepared from 100 parts by weight of synthetic noncrystalline silica (Siloid 74, product of Fuji-Davison Chemical Co.), 40 parts by weight of polyvinyl alcohol (PVA-613, product of Kuraray Co., Ltd.) and 20 parts by weight of a cationic resin (Polyfix 601, product of Showa Kobunshi Co., Ltd.), followed by drying at 120° C. for 10 minutes.

The recording sheets obtained in the above examples and comparative examples were evaluated for their characteristics. The results are shown in Table 1.

TABLE 1

| | Ink absorption | Water resistance | Image sharpness | Blocking Resistance |
|---|---|---|---|---|
| Example 14 | ≦30 secs. | ⊚ | ⊚ | ⊚ |
| Example 15 | ≦30 secs. | ⊚ | ⊚ | ⊚ |
| Comp. Ex. 4 | 2 mins. | X | | X |
| Example 16 | 1 min. | ⊚ | ⊚ | ⊚ |
| Example 17 | ≦30 secs. | ⊚ | ⊚ | ⊚ |
| Comp. Ex. 5 | 3 mins. | X | | X |
| Example 18 | 1 min. | ⊚ | ⊚ | ⊚ |
| Example 19 | ≦30 secs. | ⊚ | ⊚ | ⊚ |
| Comp. Ex. 6 | 3 mins. | | | |
| Example 20 | 1 min. | ⊚ | ⊚ | ⊚ |
| Example 21 | ≦30 secs. | ⊚ | ⊚ | ⊚ |
| Comp. Ex. 7 | 3 mins. | | | |
| Example 22 | ≦30 secs. | ⊚ | ⊚ | ⊚ |
| Comp. Ex. 8 | 3 mins. | | | |

As is evident from Table 1, the use of the recording sheets obtained in the examples ensures not only good ink absorption and image sharpness, but also high water resistance and blocking resistance. On the other hand, the use of the recording sheets obtained in the comparative examples results in relatively good ink absorption and image sharpness, but the water resistance and blocking resistance are unsatisfactory.

With regard to the above-mentioned Examples 7 to 11 and Comparative Example 3, the results of evaluation as recording sheets are shown in Table 2. In Examples 7 to 11 and Comparative Example 3, the water resistance and printability were evaluated as mentioned below.

[Water Resistance]

The printed portion was immersed in water at 30° C. for 1 minute, then pulled up vertically, drained well and dried. After the drying, the printed portion was visually evaluated according to the following criteria.
○ The printed portion remaining intact
Δ A Blurring observed in the printed portion
X No print remaining

[State of Printing]

The state of printing in the printed portion was visually evaluated according to the following criteria.
○ Uniform printing in the printed portion
Δ A Blurring observed in the printed portion
X Marked blurring in the printed portion

TABLE 2

|  | Mean pore size (μm) | Porosity (%) | Light transmittance (%) | Water absorption | Water Resistance | Printability |
|---|---|---|---|---|---|---|
| Example 7 | 0.3 | 52 | 40 | ½ min. | ○ | ○ |
| Example 8 | 0.2 | 33 | 40 | ½ min. | ○ | ○ |
| Example 9 | 0.01 | 10 | 41 | ½ min. | ○ | ○ |
| Example 10 | 0.08 | 48 | 39 | ½ min. | ○ | ○ |
| Example 11 | 0.1 | 30 | 36 | ½ min. | ○ | ○ |
| Comp. Ex. 3 | 3 | 32 | 2 | 5 mins. | X | X |

Example 23

A 15 μm thick ink-absorbing layer was formed on a 100 μm thick polyethylene terephthalate film (Melinex 705; product of ICI Japan) already treated for facilitating adhesion, by applying thereto a 15% (by weight) aqueous solution of a modified vinyl acetate-series copolymer (OKS-7158G, product of Nippon Synthetic Chemical Industry), followed by 3 minutes of drying at 120° C.

A coating composition (dope) was prepared by adding 15 parts by weight of 3-methoxybutyl acetate to 100 parts by weight of a 13% (by weight) solution of polymethyl methacrylate (product of Scientific Polymer Products) in N,N-dimethylformamide with thorough stirring. This coating composition was applied onto the ink-absorbing layer and dried at a temperature of 60° C. and a humidity of 95% RH for 1.5 minutes and then at 120° C. for 3 hours, to give a porous layer having a mean pore size of 0.15 μm, a porosity of 45% and a thickness of 10 μm.

The recording sheet thus obtained showed a light transmittance of 72% at the wavelength of 400 nm, thus exhibiting its excellent transparency.

The evaluation of the above product as a recording sheet gave the following marks, ink absorption: 1 minute; water resistance: ◎; image sharpness: ◎; and blocking resistance: ◎.

Example 24

A 15 μm thick ink-absorbing layer was formed on a 100 μm thick polyethylene terephthalate film (Melinex 705; product of ICI Japan) already treated for facilitating adhesion, by applying thereto a 15% (by weight) aqueous solution of a modified vinyl acetate-series copolymer (OKS-7158G, product of Nippon Synthetic Chemical Industry Co., Ltd.), followed by 3 minutes of drying at 120° C. A coating composition (dope) was prepared by adding 15 parts by weight of 3-methoxybutyl acetate to 100 parts by weight of a 14% (by weight) solution of a polyethersulfone (P4800, product of Sumitomo Chemical Company Ltd.) in N,N-dimethylformamide with thorough stirring. The coating composition was applied onto the ink-absorbing layer and dried at a temperature of 60° C. and a humidity of 95% RH for 1.5 minutes and then at 120° C. for 3 minutes, to give a porous layer having a mean pore size of 0.05 μm, a porosity of 30% and a thickness of 10 μm.

The obtained recording sheet showed a light transmittance of 75% at the wavelength of 400 nm, thus exhibiting its excellent transparency.

The evaluation of the above product as a recording sheet gave the following marks, ink absorption: 1 minute; water resistance: ◎; image sharpness: ◎; and blocking resistance: ◎.

Comparative Example 9

An 8% (by weight) solution of cellulose acetate degree of acetylation 55%, average degree of polymerization 170) in acetone was applied to a glass plate so as to give a 30 μm coating when dried. The coated glass plate was immersed in water at 25° C. for 1 minute. The film peeled off from the glass plate and air-dried was a film having an unsymmetrical structure with a dense surface layer and a porous underlying layer having pores 3 to 8 μm in size. The film was white and opaque.

Comparative Example 10

An 8% (by weight) solution of cellulose acetate (degree of acetylation 55%, average degree of polymerization 170) in acetone was applied to a release paper to a thickness after drying of 30 μm. The coated paper was dried under conditions of 40° C. and 50% RH for 5 minutes and then at 120° C. for 3 minutes. The film, peeled off from the release paper and air-dried, showed high transparency with a light transmittance of 85% . However, the film was nonporous.

Comparative Example 11

A 14% (by weight) solution of acrylonitrile-N-vinylpyrrolidone copolymer (mole ratio 98:2; "DUY", product of Daicel Chemical Industries, Ltd.) in dimethyl sulfoxide was applied to a release paper so as to give a 30 μm coating when dried. The coated paper was dried under conditions of 70° C. and 90% RH for 1.5 minutes and then at 120° C. for 3 minutes. The film, peeled off from the release paper and air-dried, showed high transparency with a light transmittance of 82%. However, the film was nonporous.

What is claimed is:

1. A porous membrane comprising at least one polymer selected from the group consisting of cellulose derivatives, vinyl-series polymers and polysulfone-series polymers, and showing a light transmittance of not less than 30% at the wavelength of 400 nm.

2. A porous membrane as claimed in claim 1 which has a micro phase separation structure.

3. A porous membrane as claimed in claim 1 which has pores having a mean pore size of 0.002 to 0.35 μm, with the maximum pore size of not larger than 0.4 μm.

4. A porous membrane as claimed in claim 1 which has a porosity of 15 to 55%.

5. A porous membrane as claimed in claim 1, wherein said polymer is at least one polymer selected from the group consisting of cellulose esters, (meth)acrylonitrile-series polymers, (meth)acrylic acid ester-series polymers and polysulfone-series polymers.

6. A porous membrane as claimed in claim 1, wherein said polymer is at least one member selected from the group consisting of:
   (a) cellulose acetate with a degree of acetylation of 42 to 62% and a viscosity average polymerization degree of 50 to 800;
   (b) homopolymers or copolymers obtainable from a monomer selected from the group consisting of (meth)

acrylonitrile, (meth)acrylic acid ester-series monomers, vinyl ester-series monomers, heterocyclic vinyl-series monomers, aromatic vinyl monomers, and polymerizable unsaturated dicarboxylic acids or derivatives thereof; and (c) at least one member selected from the group consisting of polysulfone and polyethersulfone.

7. A porous membrane (A) comprising at least one polymer selected from the group consisting of cellulose derivatives, vinyl-series polymers and polysulfone-series polymers, (B1) having a porosity of 10 to 60% or (B2) having pores with a mean pore size of 0.002 to 0.35 $\mu$m and a maximum pore size of not larger than 0.4 $\mu$m, and (C) showing a light transmittance of not less than 30% at the wavelength of 400 nm.

8. A porous membrane as claimed in claim 7, wherein the light transmittance is not less than 50%.

9. A laminate film which comprises a substrate and a porous layer formed on at least one side of said substrate, said porous layer comprising at least one polymer selected from the group consisting of cellulose derivatives, vinyl-series polymers and polysulfone-series polymers and having a light transmittance of not less than 30% at the wavelength of 400 nm.

10. A laminate film which comprises a plurality of substrates and a porous layer interposed or sandwiched between said substrates, said porous layer comprising at least one polymer selected from the group consisting of cellulose derivatives, vinyl-series polymers and polysulfone-series polymers and having a light transmittance of not less than 30% at the wavelength of 400 nm.

11. A process for producing porous membranes recited in claim 1, which comprises drying a coating layer or film of a dope comprising a polymer, a good solvent for the polymer and a poor solvent for the polymer, said poor solvent having a higher boiling point than the good solvent.

12. A process for producing porous membranes as claimed in claim 11, wherein said dope comprises a polymer, at least one good solvent selected from the group consisting of ketones, esters, ethers, cellosolves, cellosolve acetates, aromatic hydrocarbons, halogenated hydrocarbons, nitro compounds, amides, sulfoxides and nitriles, said good solvent having a boiling point of 35 to 200° C., and at least one poor solvent selected from the group consisting of esters, alcohols, ketones, ethers and aliphatic hydrocarbons, said poor solvent having a boiling point of 100 to 230° C.

13. A process for producing porous membranes as claimed in claim 11, wherein said dope comprises at least one good solvent selected from the group consisting of $C_{3-5}$ dialkyl ketones, $C_{1-4}$ alkyl acetates, cyclic or linear $C_{4-6}$ ethers, $C_{1-4}$ alkyl-cellosolves, $C_{1-4}$ alkyl-cellosolve acetates, mono- or di-$C_{1-4}$ acylamides, di-$C_{1-3}$ alkyl sulfoxides and $C_{1-6}$ alkylnitriles, and at least one poor solvent selected from the group consisting of $C_{5-8}$ alkyl formates, $C_{3-10}$ alkyl-$C_{2-4}$ aliphatic carboxylates which may have a $C_{1-4}$ alkoxy group, $C_{1-4}$ alkyl benzoates, $C_{4-8}$ cycloalkanols which may have an alkyl group, $C_{2-6}$ alkoxy-$C_{1-4}$ alcohols, $C_{6-10}$ dialkyl ketones, $C_{7-10}$ ethers and $C_{5-20}$ aliphatic hydrocarbons.

14. A process for producing porous membranes as claimed in claim 11, wherein the difference in boiling points between the good solvent and the poor solvent is 20 to 60° C.

15. A process for producing porous membranes as claimed in claim 11, wherein the drying is carried out first at a temperature of 10 to 100° C. and a relative humidity of 50 to 90% for 30 seconds to 60 minutes and further at a temperature higher than said temperature for 2 seconds to 30 minutes.

16. A process for producing porous membranes as claimed in claim 11, wherein the proportion of the poor solvent is 1 to 50 parts by weight per 100 parts by weight of the good solvent.

17. A process for producing porous membranes as claimed in claim 11, wherein said dope contains 3 to 40 parts by weight of the poor solvent per 100 parts by weight of a 5 to 30% (by weight) solution of said polymer in the good solvent.

18. A recording sheet which comprises a substrate, an ink-absorbing layer formed on at least one side of said substrate, and a porous polymer layer having a micro phase separation structure formed on said ink-absorbing layer, wherein said porous polymer layer comprises at least one polymer selected from the group consisting of cellulose derivatives, vinyl-series polymers and polysulfone-series polymers.

19. A recording sheet as claimed in claim 18, wherein the mean pore size of said porous layer is 0.01 to 0.35 $\mu$m.

20. A porous membrane produced by a process comprising drying a coating layer or film of a dope comprising at least one polymer selected from the group consisting of cellulose derivatives, vinyl-series polymers and polysulfone-series polymers, a good solvent for the polymer and a poor solvent for the polymer, wherein the poor solvent having a higher boiling point than the good solvent and the proportion of the poor solvent is 1 to 50 parts by weight per 100 parts by weight of the good solvent, and which shows a light transmittance of not less than 30% at the wavelength of 400 nm and has a micro phase separation structure and a mean pore size of 0.002 to 0.35 $\mu$m with the maximum pore size of not larger than 0.4 $\mu$m.

21. A porous membrane as claimed in claim 6, wherein said homopolymer or copolymer (b) is obtainable from a monomer selected from the group consisting of (meth)acrylonitrile and (meth)acrylic acid ester-series monomers.

* * * * *